US012262253B2

(12) United States Patent
Kim et al.

(10) Patent No.: US 12,262,253 B2
(45) Date of Patent: Mar. 25, 2025

(54) SUPPORT OF SERVICE CONTINUITY BETWEEN SNPN AND PLMN

(71) Applicant: LG ELECTRONICS INC., Seoul (KR)

(72) Inventors: Seokjung Kim, Seoul (KR); Myungjune Youn, Seoul (KR); Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 398 days.

(21) Appl. No.: 17/904,643

(22) PCT Filed: Mar. 8, 2021

(86) PCT No.: PCT/KR2021/002793
§ 371 (c)(1),
(2) Date: Aug. 19, 2022

(87) PCT Pub. No.: WO2021/187783
PCT Pub. Date: Sep. 23, 2021

(65) Prior Publication Data
US 2023/0094211 A1    Mar. 30, 2023

(30) Foreign Application Priority Data

Mar. 19, 2020  (KR) .................. 10-2020-0034043

(51) Int. Cl.
*H04W 36/00* (2009.01)
*H04W 36/12* (2009.01)
(Continued)

(52) U.S. Cl.
CPC . *H04W 36/0022* (2013.01); *H04W 36/00698* (2023.05); *H04W 36/12* (2013.01); *H04W 36/1443* (2023.05); *H04W 84/042* (2013.01)

(58) Field of Classification Search
None
See application file for complete search history.

(56) References Cited

U.S. PATENT DOCUMENTS 9,801,067 B1 * 10/2017 Hsieh ................. H04W 12/069
2014/0082697 A1 * 3/2014 Watfa ................. H04L 63/0485
726/3
(Continued)

FOREIGN PATENT DOCUMENTS

CN    110249667 A  *  9/2019  ............ H04W 24/10
CN    110771223 A  *  2/2020  ............ H04W 48/16
(Continued)

OTHER PUBLICATIONS

PCT International Application No. PCT/KR2021/002793, International Search Report dated Jun. 21, 2021, 2 page.
(Continued)

*Primary Examiner* — Andrew C Oh
(74) *Attorney, Agent, or Firm* — LEE, HONG, DEGERMAN, KANG & WAIMEY

(57) ABSTRACT

A method and apparatus for support of service continuity between stand-alone non-public network (SNPN) and public land mobile network (PLMN) is provided. A wireless device transmits, to an access and mobility management function (AMF) of a source network, a protocol data unit (PDU) session establishment request to establish a PDU session with the source network via a non-3GPP interworking function (N3IWF) of the source network. The PDU session establishment request includes information informing that data delivery is not available via the PDU session. The wireless device determines to move from the source network to a target network, and transmits, to a user plane function (Continued)

(UPF) of the source network, mobility information informing that the wireless device moves from the source network to the target network.

14 Claims, 13 Drawing Sheets

(51) Int. Cl.
*H04W 36/14* (2009.01)
*H04W 84/04* (2009.01)

(56) References Cited

U.S. PATENT DOCUMENTS

| | | | | |
|---|---|---|---|---|
| 2016/0057680 | A1* | 2/2016 | Koskinen | H04W 36/0072 370/338 |
| 2017/0289873 | A1* | 10/2017 | Kim | H04W 36/00698 |
| 2017/0318458 | A1* | 11/2017 | Laselva | H04W 12/041 |
| 2019/0349849 | A1* | 11/2019 | Kavuri | H04W 8/18 |
| 2019/0394711 | A1* | 12/2019 | Kim | H04W 76/25 |
| 2020/0275511 | A1* | 8/2020 | Liu | H04W 88/023 |

FOREIGN PATENT DOCUMENTS

| | | | | |
|---|---|---|---|---|
| CN | 113574962 B | * | 2/2024 | H04W 60/00 |
| EP | 3840469 A1 | * | 6/2021 | H04W 36/0016 |
| KR | 2018-0109714 | | 10/2018 | |
| WO | WO-2013120274 A1 | * | 8/2013 | H04W 35/0055 |
| WO | WO-2015024164 A1 | * | 2/2015 | H04W 48/12 |
| WO | WO-2015172580 A1 | * | 11/2015 | H04W 36/14 |
| WO | WO-2019033967 A1 | * | 2/2019 | H04L 63/0876 |
| WO | WO-2019076275 A1 | * | 4/2019 | H04W 76/18 |
| WO | 2020-092173 | | 5/2020 | |
| WO | 2020-102512 | | 5/2020 | |
| WO | 2020-151696 | | 7/2020 | |
| WO | WO-2020151696 A1 | * | 7/2020 | H04L 63/00 |
| WO | WO-2020166881 A1 | * | 8/2020 | H04W 24/10 |
| WO | WO-2021134601 A1 | * | 7/2021 | |

OTHER PUBLICATIONS

Ericsson, "Solution to support service continuity between two networks and paging from both networks," S2-2000193, SA WG2 Meeting #S2-136AH, Jan. 2020, 9 pages.

3rd Generation Partnership Project, "Technical Specification Group Services and System Aspects; Procedures for the 5G System (5GS); Stage 2 (Release 16)," pp. 44-358 and figure 4.12.5-1, Sections 4.2.2.2, 4.3.2 and 4.22 of 3GPP TS 23.502 V16.3.0, Dec. 2019, 560 pages.

Nokia et al., "Target Access type in N1N2MessageTransfer Request for a MA PDU session," C4-194360, 3GPP TSG-CT WG4 Meeting #94, Oct. 2019, 13 pages.

InterDigital, Inc., "Support for Multi-Access PDU Session in URSP and PDU session selection," S2-1900373, 3GPP TSG-SA WG2 Meeting #130, Jan. 2019, 9 pages.

3rd Generation Partnership Project, "Technical Specification Group Services and System Aspects; System architecture for the 5G System (5GS): Stage 2 (Release 16)," Sections 5.32, 4.2.8.1, and 5.30.2 of 3GPP TS 23.501 V16.3.0, Dec. 2019, 417 pages.

* cited by examiner

SUPPORT OF SERVICE CONTINUITY BETWEEN SNPN AND PLMN

CROSS-REFERENCE TO RELATED APPLICATION(S)

This application is the National Stage filing under 35 U.S.C. 371 of International Application No. PCT/KR2021/002793, filed on Mar. 8, 2021, which claims the benefit of earlier filing date and right of priority to Korean Application No. 10-2020-0034043, filed on Mar. 19, 2020, the contents of which are all hereby incorporated by reference herein in their entireties.

TECHNICAL FIELD

The present disclosure relates to support of service continuity between stand-alone non-public network (SNPN) and public land mobile network (PLMN).

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Non-public networks (NPN) are intended for the sole use of a private entity such as an enterprise, and may be deployed in a variety of configurations, utilizing both virtual and physical elements. Specifically, they may be deployed as completely standalone networks, they may be hosted by a public land mobile network (PLMN), or they may be offered as a slice of a PLMN.

In any of these deployment options, it is expected that unauthorized user equipments (UEs), those that are not associated with the enterprise, will not attempt to access the non-public network, which could result in resources being used to reject that UE and thereby not be available for the UEs of the enterprise. It is also expected that UEs of the enterprise will not attempt to access a network they are not authorized to access. For example, some enterprise UEs may be restricted to only access the non-public network of the enterprise, even if PLMN coverage is available in the same geographic area. Other enterprise UEs may be able to access both a non-public network and a PLMN where specifically allowed.

SUMMARY

How to support service continuity between a stand-alone non-public network (SNPN) and a public land mobile network (PLMN) may need to be addressed.

In an aspect, a method performed by a wireless device operating in a wireless communication system is provided. The method includes transmitting, to an access and mobility management function (AMF) of a source network, a protocol data unit (PDU) session establishment request to establish a PDU session with the source network via a non-3GPP interworking function (N3IWF) of the source network. The PDU session establishment request includes information informing that data delivery is not available via the PDU session. The method further includes determining to move from the source network to a target network, and transmitting, to a user plane function (UPF) of the source network, mobility information informing that the wireless device moves from the source network to the target network.

In another aspect, an apparatus for implementing the above method is provided.

For example, since there is no setup for indirect data forwarding tunnel and the UE easily initiates to change the data delivery path without a specific control plane signaling exchange, the DL data can be delivered to the UE quickly.

For example, by creating a backup UP connection in advance in case the UE moves between SNPN and PLMN, VIAPA services can be quickly provided to users by reducing the process required to handover PDU sessions that provide VIAPA services.

For example, it can be avoided to prevent disrupting user experience.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
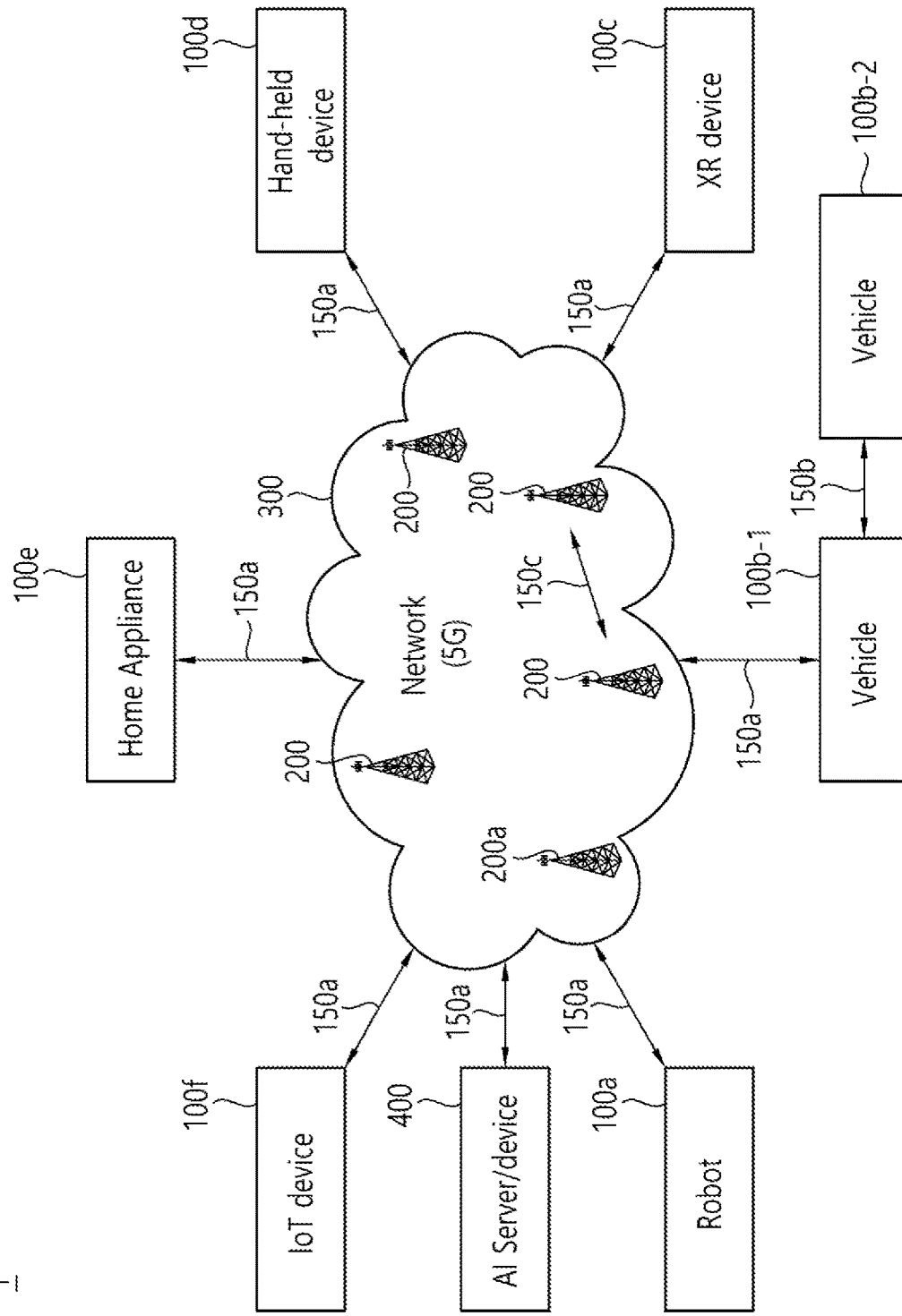
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G new radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
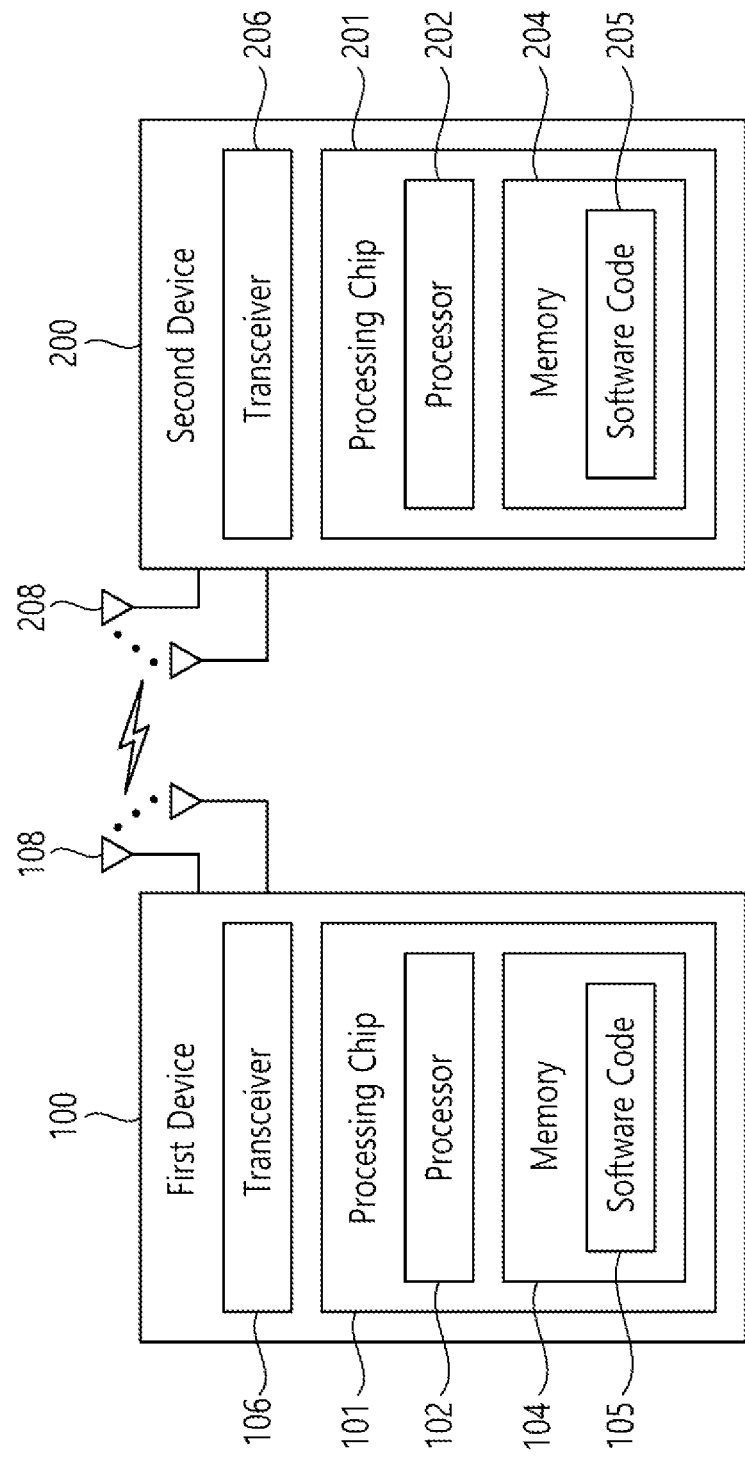
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
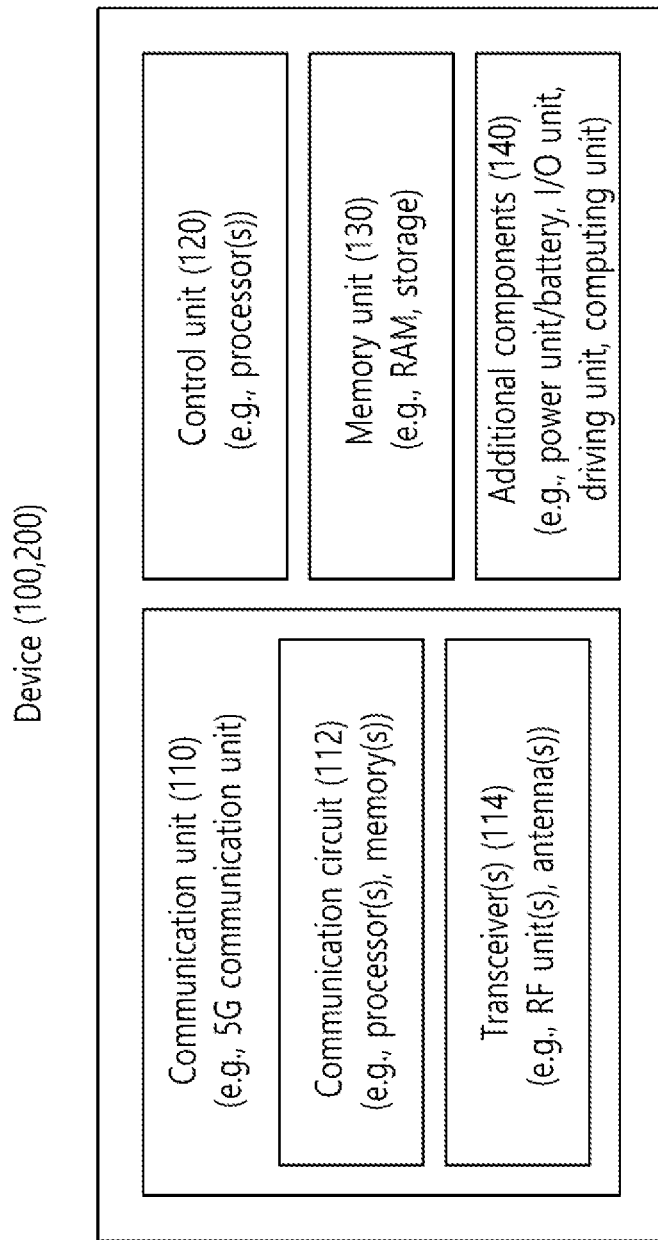
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
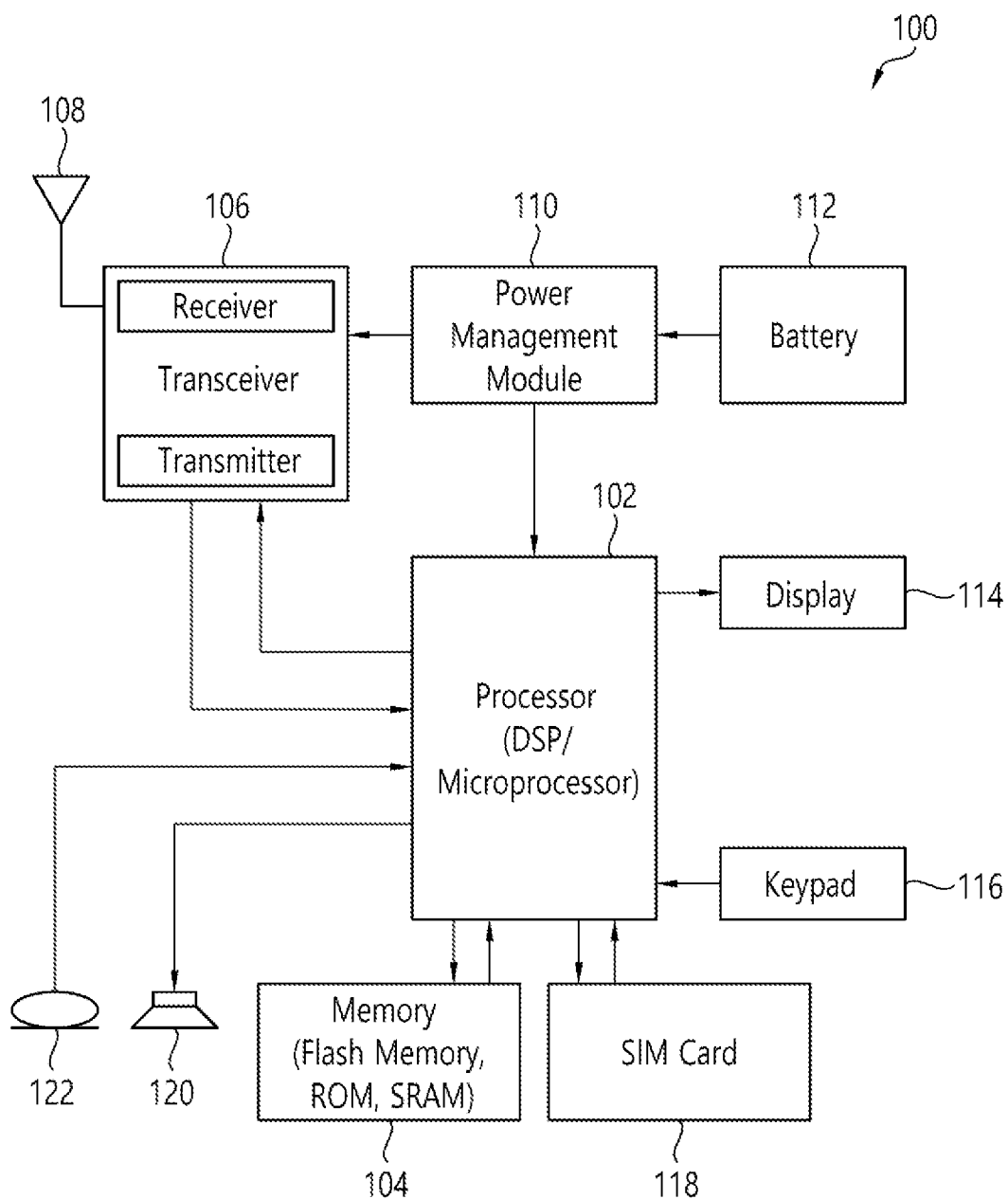
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
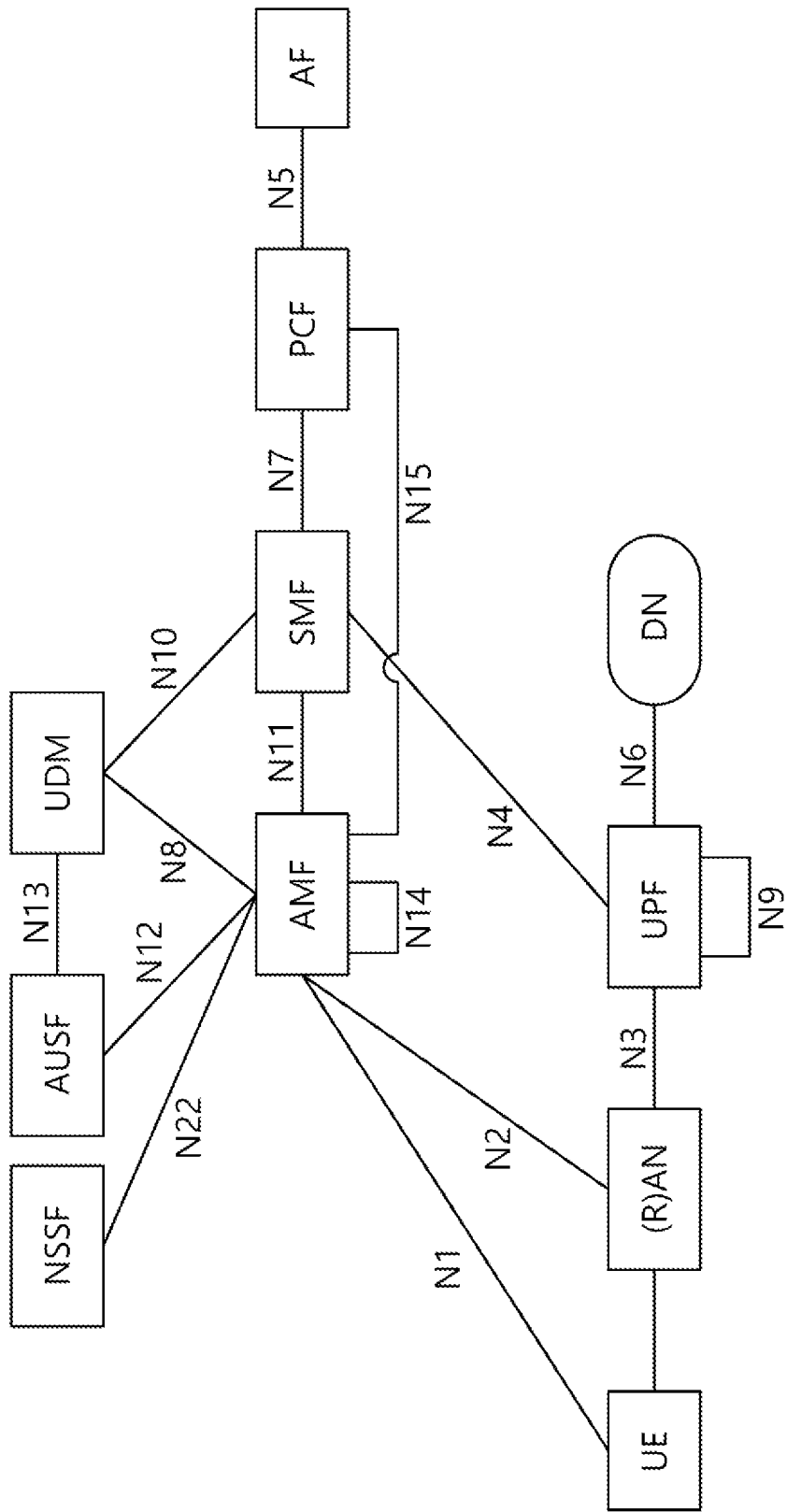
FIG. 5 shows an example of 5G system architecture to which implementations of the present disclosure is applied.

FIG. 5 shows an example of 5G system architecture to which implementations of the present disclosure is applied.

The 5G system (5GS) architecture consists of the following network functions (NF).

Authentication Server Function (AUSF)
Access and Mobility Management Function (AMF)
Data Network (DN), e.g., operator services, Internet access or 3rd party services
Unstructured Data Storage Function (UDSF)
Network Exposure Function (NEF)
Intermediate NEF (I-NEF)
Network Repository Function (NRF)
Network Slice Selection Function (NSSF)
Policy Control Function (PCF)
Session Management Function (SMF)
Unified Data Management (UDM)
Unified Data Repository (UDR)
User Plane Function (UPF)
UE radio Capability Management Function (UCMF)
Application Function (AF)
User Equipment (UE)
(Radio) Access Network ((R)AN)
5G-Equipment Identity Register (5G-EIR)
Network Data Analytics Function (NWDAF)
CHarging Function (CHF)

Furthermore, the following network functions may be considered.

Non-3GPP InterWorking Function (N3IWF)
Trusted Non-3GPP Gateway Function (TNGF)
Wireline Access Gateway Function (W-AGF)

FIG. 5 depicts the 5G system architecture in the non-roaming case, using the reference point representation showing how various network functions interact with each other.

In FIG. 5, for the sake of clarity of the point-to-point diagrams, the UDSF, NEF and NRF have not been depicted. However, all depicted Network Functions can interact with the UDSF, UDR, NEF and NRF as necessary.

For clarity, the UDR and its connections with other NFs, e.g., PCF, are not depicted in FIG. 5. For clarity, the NWDAF and its connections with other NFs, e.g., PCF, are not depicted in FIG. 5.

The 5G system architecture contains the following reference points:

N1: Reference point between the UE and the AMF.
N2: Reference point between the (R)AN and the AMF.
N3: Reference point between the (R)AN and the UPF.
N4: Reference point between the SMF and the UPF.
N6: Reference point between the UPF and a Data Network.
N9: Reference point between two UPFs.

The following reference points show the interactions that exist between the NF services in the NFs.

N5: Reference point between the PCF and an AF.
N7: Reference point between the SMF and the PCF.
N8: Reference point between the UDM and the AMF.
N10: Reference point between the UDM and the SMF.
N11: Reference point between the AMF and the SMF.
N12: Reference point between the AMF and the AUSF.
N13: Reference point between the UDM and the AUSF.
N14: Reference point between two AMFs.
N15: Reference point between the PCF and the AMF in the case of non-roaming scenario, PCF in the visited network and AMF in the case of roaming scenario.
N16: Reference point between two SMFs, (in roaming case between SMF in the visited network and the SMF in the home network).
N22: Reference point between the AMF and the NSSF.

In some cases, a couple of NFs may need to be associated with each other to serve a UE.

A registration procedure is described. Section 4.2.2.2 of 3GPP TS 23.502 V16.3.0 (2019-12) can be referred.

Figure 6:
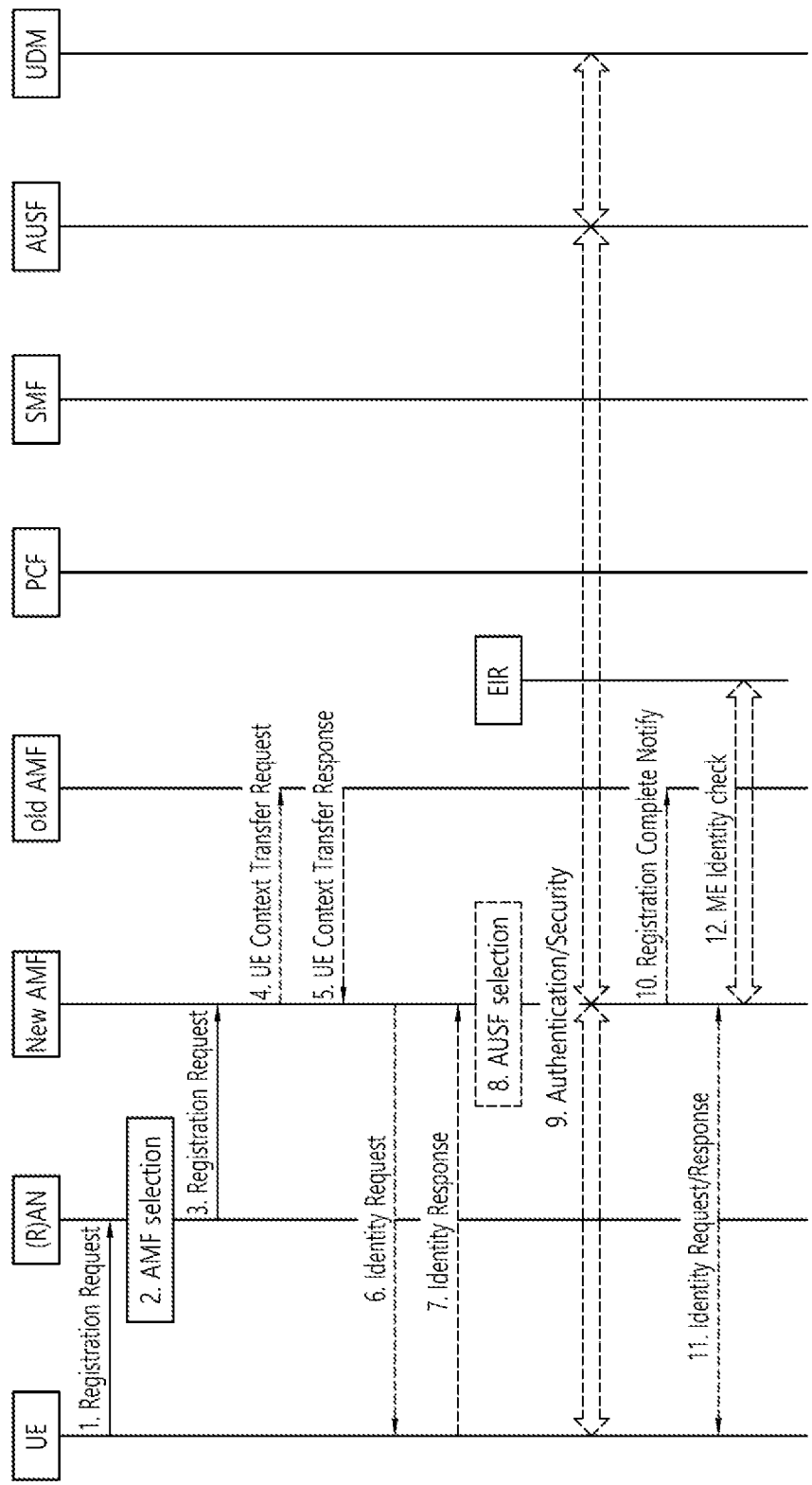
FIGS. 6 and 7 show an example of a registration procedure to which implementations of the present disclosure is applied.
Figure 7:
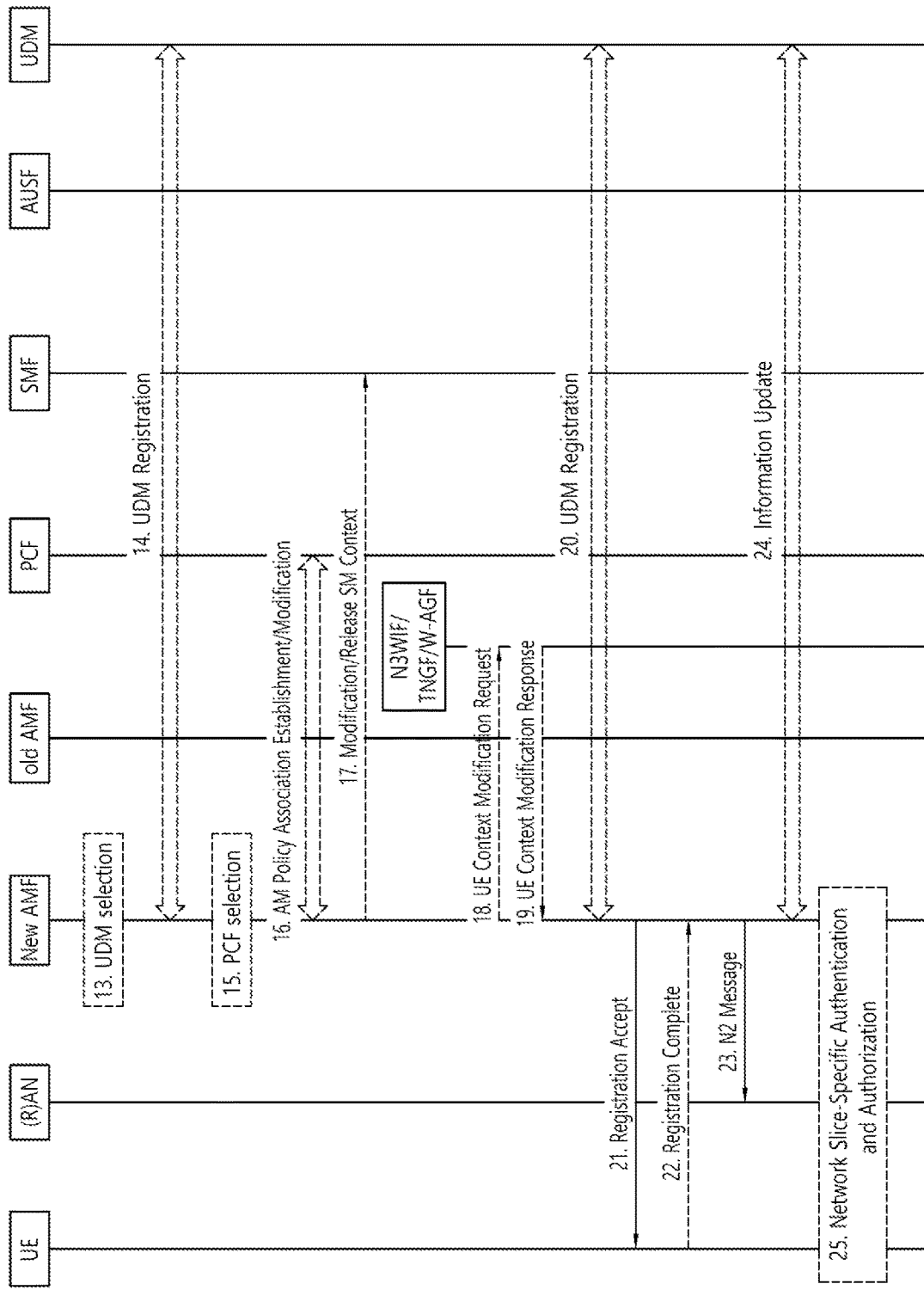

FIGS. 6 and 7 show an example of a registration procedure to which implementations of the present disclosure is applied.

A UE needs to register with the network to get authorized to receive services, to enable mobility tracking and to enable reachability. The UE initiates the registration procedure using one of the following registration types:

Initial registration to the 5GS; or
Mobility registration update; or
Periodic registration update; or
Emergency registration.

The general registration procedure in FIGS. 6 and 7 applies on all these registration procedures, but the periodic registration update need not include all parameters that are used in other registration cases.

The general registration procedure in FIGS. 6 and 7 is also used for the case of registration in 3GPP access when the UE is already registered in a non-3GPP access, and vice versa. Registration in 3GPP access when the UE is already registered in a non-3GPP access scenario may require an AMF change.

First, procedures of FIG. 6 are described.

(1) Step 1: The UE transmits a Registration Request message to the (R)AN. The Registration Request message corresponds to AN message.

The Registration Request message may include AN parameters. In the case of NG-RAN, the AN parameters include, e.g., 5G SAE temporary mobile subscriber identity (5G-S-TMSI) or globally unique AMF ID (GUAMI), the selected public land mobile network (PLMN) ID (or PLMN ID and network identifier (NID)) and Requested network slice selection assistance information (NSSAI). The AN parameters also include establishment cause. The establishment cause provides the reason for requesting the establishment of an RRC connection. Whether and how the UE includes the Requested NSSAI as part of the AN parameters is dependent on the value of the access stratum connection establishment NSSAI inclusion mode parameter.

The Registration Request message may include a registration type. The registration type indicates if the UE wants to perform an initial registration (i.e., the UE is in RM-DEREGISTERED state), a mobility registration update (i.e., the UE is in RM-REGISTERED state and initiates a registration procedure due to mobility or due to the UE needs to update its capabilities or protocol parameters, or to request a change of the set of network slices it is allowed to use), a periodic registration update (i.e., the UE is in RM-REGISTERED state and initiates a registration procedure due to the periodic registration update timer expiry) or an emergency registration (i.e., the UE is in limited service state).

When the UE is performing an initial registration, the UE shall indicate its UE identity in the Registration Request message as follows, listed in decreasing order of preference:

i) a 5G globally unique temporary identifier (5G-GUTI) mapped from an evolved packet system (EPS) GUTI, if the UE has a valid EPS GUTI.
ii) a native 5G-GUTI assigned by the PLMN to which the UE is attempting to register, if available;
iii) a native 5G-GUTI assigned by an equivalent PLMN to the PLMN to which the UE is attempting to register, if available;
iv) a native 5G-GUTI assigned by any other PLMN, if available.
v) Otherwise, the UE shall include its subscriber concealed identifier (SUCI) in the Registration Request message.

When the UE performing an initial registration has both a valid EPS GUTI and a native 5G-GUTI, the UE shall also indicate the native 5G-GUTI as additional GUTI. If more than one native 5G-GUTIs are available, the UE shall select the 5G-GUTI in decreasing order of preference among items (ii)-(iv) in the list above.

When the UE is performing an initial registration with a native 5G-GUTI, then the UE shall indicate the related GUAMI information in the AN parameters. When the UE is performing an initial registration with its SUCI, the UE shall not indicate any GUAMI information in the AN parameters.

For an emergency registration, the SUCI shall be included if the UE does not have a valid 5G-GUTI available; the permanent equipment identifier (PEI) shall be included when the UE has no subscriber permanent identifier (SUPI) and no valid 5G-GUTI. In other cases, the 5G-GUTI is included and it indicates the last serving AMF.

The Registration Request message may also include security parameters, PDU Session Status, etc. The security parameters are used for authentication and integrity protection. The PDU Session Status indicates the previously established PDU sessions in the UE. When the UE is connected to the two AMFs belonging to different PLMN via 3GPP access and non-3GPP access then the PDU Session status indicates the established PDU Session of the current PLMN in the UE.

(2) Step 2: The (R)AN selects an AMF.

If a 5G-S-TMSI or GUAMI is not included or the 5G-S-TMSI or GUAMI does not indicate a valid AMF, the (R)AN, based on (R)AT and requested NSSAI, if available, selects an AMF.

If UE is in CM-CONNECTED state, the (R)AN can forward the Registration Request message to the AMF based on the N2 connection of the UE.

If the (R)AN cannot select an appropriate AMF, it forwards the Registration Request message to an AMF which has been configured, in the (R)AN, to perform AMF selection.

(3) Step 3: The (R)AN transmits a Registration Request message to the new AMF. The Registration Request message corresponds to N2 message.

The Registration Request message may include whole information and/or a part of information included in the Registration Request message received from the UE which is described in step 1.

The Registration Request message may include N2 parameters. When NG-RAN is used, the N2 parameters include the selected PLMN ID (or PLMN ID and NID), location information and cell identity related to the cell in which the UE is camping, UE context request which indicates that a UE context including security information needs to be setup at the NG-RAN. When NG-RAN is used, the N2 parameters shall also include the establishment cause.

If the Registration type indicated by the UE is Periodic Registration Update, then steps 4 to 19 may be omitted.

(4) Step 4: If the UE's 5G-GUTI was included in the Registration Request message and the serving AMF has changed since last registration procedure, the new AMF may invoke the Namf_Communication_UEContextTransfer service operation on the old AMF including the complete registration request non-access stratum (NAS) message to request the UE's SUPI and UE context.

(5) Step 5: The Old AMF may respond to the new AMF for the Namf_Communication_UEContextTransfer invocation by including the UE's SUPI and UE context.

(6) Step 6: If the SUCI is not provided by the UE nor retrieved from the old AMF, the identity request procedure may be initiated by the new AMF sending the Identity Request message to the UE requesting the SUCI.

(7) Step 7: The UE may respond with an Identity Response message including the SUCI. The UE derives the SUCI by using the provisioned public key of the home PLMN (HPLMN).

(8) Step 8: The new AMF may decide to initiate UE authentication by invoking an AUSF. In that case, the new AMF selects an AUSF based on SUPI or SUCI.

(9) Step 9: Authentication/security may be established by the UE, new AMF, AUSF and/or UDM.

(10) Step 10: If the AMF has changed, the new AMF may notify the old AMF that the registration of the UE in the new AMF is completed by invoking the Namf_Communication_RegistrationCompleteNotify service operation. If the authentication/security procedure fails, then the registration shall be rejected, and the new AMF may invoke the Namf_Communication_RegistrationCompleteNotify service operation with a reject indication reason code towards the old AMF. The old AMF may continue as if the UE context transfer service operation was never received.

(11) Step 11: If the PEI was not provided by the UE nor retrieved from the old AMF, the Identity Request procedure may be initiated by the new AMF sending an Identity Request message to the UE to retrieve the PEI. The PEI shall be transferred encrypted unless the UE performs emergency registration and cannot be authenticated.

(12) Step 12: Optionally, the new AMF may initiate ME identity check by invoking the N5g-eir_EquipmentIdentityCheck_Get service operation.

Now, procedures of FIG. 7, which follow the procedures of FIG. 6, are described.

(13) Step 13: If step 14 below is to be performed, the new AMF, based on the SUPI, may select a UDM, then UDM may select a UDR instance.

(14) Step 14: The new AMF may register with the UDM.

(15) Step 15: The new AMF may select a PCF.

(16) Step 16: The new AMF may optionally perform an AM Policy Association Establishment/Modification.

(17) Step 17: The new AMF may transmit Update/Release SM Context message (e.g., Nsmf_PDUSession_UpdateSMContext and/or Nsmf_PDUSession_ReleaseSMContext) to the SMF.

(18) Step 18: If the new AMF and the old AMF are in the same PLMN, the new AMF may send a UE Context Modification Request to the N3IWF/TNGF/W-AGF.

(19) Step 19: The N3IWF/TNGF/W-AGF may send a UE Context Modification Response to the new AMF.

(20) Step 20: After the new AMF receives the response message from the N3IWF/TNGF/W-AGF in step 19, the new AMF may register with the UDM.

(21) Step 21: The new AMF transmits a Registration Accept message to the UE.

The new AMF sends a Registration Accept message to the UE indicating that the Registration Request has been accepted. 5G-GUTI is included if the new AMF allocates a new 5G-GUTI. If the UE is already in RM-REGISTERED state via another access in the same PLMN, the UE shall use the 5G-GUTI received in the Registration Accept message for both registrations. If no 5G-GUTI is included in the Registration Accept message, then the UE uses the 5G-GUTI assigned for the existing registration also for the new registration. If the new AMF allocates a new registration area, it shall send the registration area to the UE via Registration Accept message. If there is no registration area included in the Registration Accept message, the UE shall consider the old registration area as valid. Mobility Restrictions is included in case mobility restrictions applies for the UE and registration type is not emergency registration. The new AMF indicates the established PDU sessions to the UE in the PDU Session status. The UE removes locally any internal resources related to PDU sessions that are not marked as established in the received PDU Session status. When the UE is connected to the two AMFs belonging to different PLMN via 3GPP access and non-3GPP access then the UE removes locally any internal resources related to the PDU session of the current PLMN that are not marked as established in received PDU Session status. If the PDU Session status information was in the Registration Request message, the new AMF shall indicate the PDU Session status to the UE.

The Allowed NSSAI provided in the Registration Accept message is valid in the registration area and it applies for all the PLMNs which have their tracking areas included in the registration area. The Mapping Of Allowed NSSAI is the mapping of each S-NSSAI of the Allowed NSSAI to the HPLMN S-NSSAIs. The Mapping Of Configured NSSAI is the mapping of each S-NSSAI of the Configured NSSAI for the serving PLMN to the HPLMN S-NSSAIs.

Furthermore, optionally the new AMF performs a UE Policy Association Establishment.

(22) Step 22: The UE may send a Registration Complete message to the new AMF when it has successfully updated itself.

The UE may send a Registration Complete message to the new AMF to acknowledge if a new 5G-GUTI was assigned.

(23) Step 23: For registration over 3GPP Access, if the new AMF does not release the signaling connection, the new AMF may send the RRC Inactive Assistance Information to the NG-RAN. For registration over non-3GPP Access, if the UE is also in CM-CONNECTED state on 3GPP access, the new AMF may send the RRC Inactive Assistance Information to the NG-RAN.

(24) Step 24: The new AMF may perform information update towards the UDM.

(25) Step 25: The UE may execute Network Slice-Specific Authentication and Authorization procedure.

A PDU session establishment procedure is described. Section 4.3.2 of 3GPP TS 23.502 V16.3.0 (2019-12) can be referred.

Figure 8:
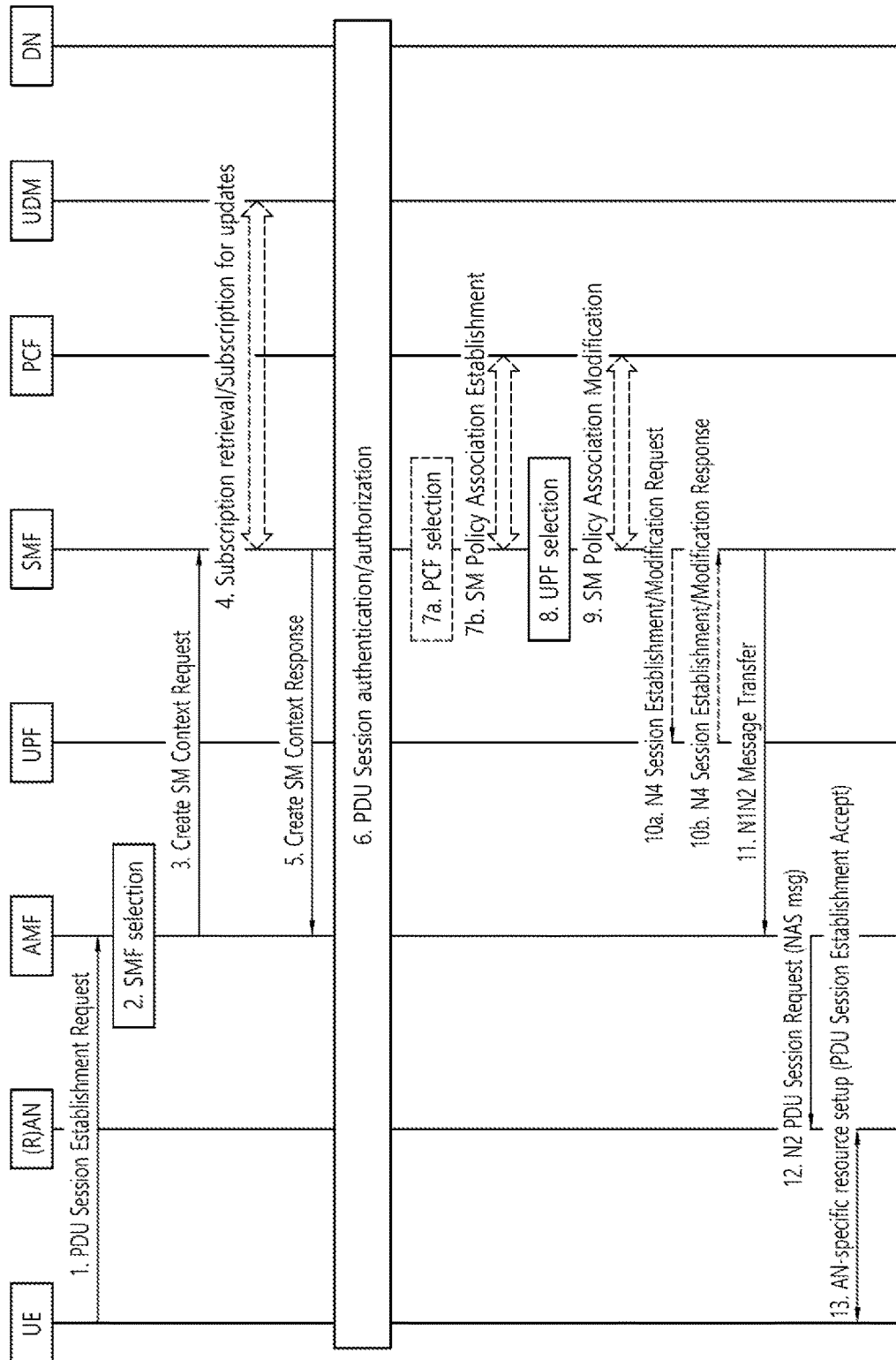
FIGS. 8 and 9 show an example of a PDU session establishment procedure to which implementations of the present disclosure is applied.
Figure 9:
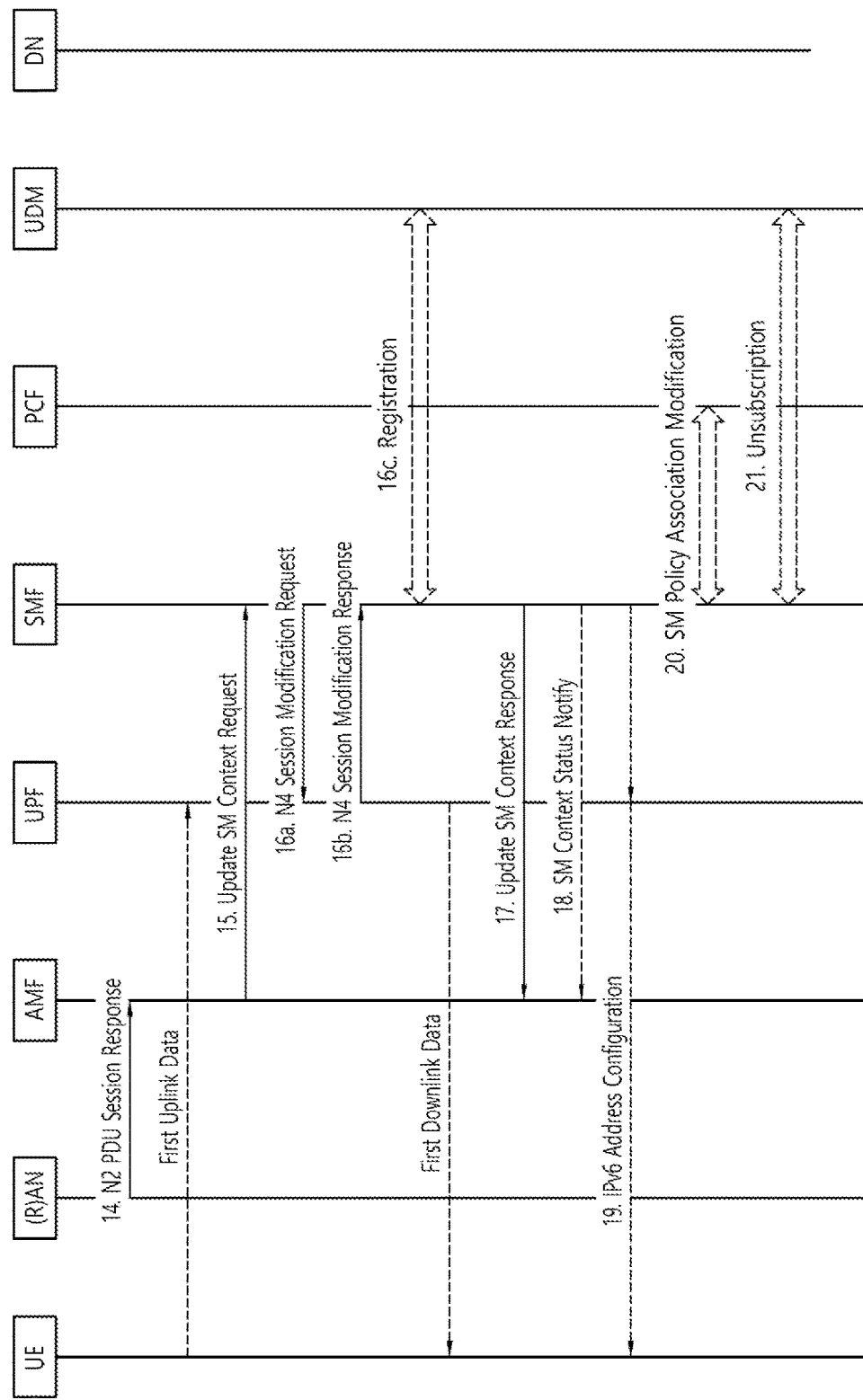

FIGS. 8 and 9 show an example of a PDU session establishment procedure to which implementations of the present disclosure is applied.

A PDU session establishment may correspond to:
- a UE initiated PDU session establishment procedure.
- a UE initiated PDU session handover between 3GPP and non-3GPP.
- a UE initiated PDU session handover from EPS to 5GS.
- a network triggered PDU session establishment procedure.

A PDU session may be associated either (a) with a single access type at a given time, i.e., either 3GPP access or non-3GPP access, or (b) simultaneously with multiple access types, i.e., one 3GPP access and one non-3GPP access. A PDU session associated with multiple access types is referred to as multi access PDU (MA PDU) session and it may be requested by access traffic steering, switching, splitting (ATSSS)-capable UEs.

FIGS. 8 and 9 specify the procedures for establishing PDU sessions associated with a single access type at a given time.

The procedure shown in FIGS. 8 and 9 assumes that the UE has already registered on the AMF thus unless the UE is emergency registered the AMF has already retrieved the user subscription data from the UDM.

First, procedures of FIG. 8 are described.

(1) Step 1: In order to establish a new PDU session, the UE generates a new PDU session ID.

The UE initiates the UE requested PDU session establishment procedure by the transmission of a NAS message containing a PDU Session Establishment Request message within the N1 SM container. The PDU Session Establishment Request message includes a PDU session ID, Requested PDU Session Type, a Requested session and service continuity (SSC) mode, 5GSM Capability, protocol configuration options (PCO), SM PDU DN Request Container, UE Integrity Protection Maximum Data Rate, etc.

The Request Type indicates "Initial request" if the PDU session establishment is a request to establish a new PDU session and indicates "Existing PDU Session" if the request refers to an existing PDU session switching between 3GPP access and non-3GPP access or to a PDU session handover from an existing packet data network (PDN) connection in EPC. The Request Type indicates "Emergency Request" if the PDU session establishment is a request to establish a PDU session for emergency services. The Request Type indicates "Existing Emergency PDU Session" if the request refers to an existing PDU session for emergency services switching between 3GPP access and non-3GPP access or to a PDU session handover from an existing PDN connection for emergency services in EPC.

The UE includes the S-NSSAI from the Allowed NSSAI of the current access type. If the Mapping of Allowed NSSAI was provided to the UE, the UE shall provide both the S-NSSAI of the visited PLMN (VPLMN) from the Allowed NSSAI and the corresponding S-NSSAI of the HPLMN from the Mapping Of Allowed NSSAI.

(2) Step 2: The AMF selects an SMF. If the Request Type indicates "Initial request" or the request is due to handover from EPS or from non-3GPP access serving by a different AMF, the AMF stores an association of the S-NSSAI(s), the data network name (DNN), the PDU session ID, the SMF ID as well as the Access Type of the PDU session.

If the Request Type is "initial request" and if the Old PDU session ID indicating the existing PDU session is also contained in the message, the AMF selects an SMF and stores an association of the new PDU Session ID, the S-NSSAI(s), the selected SMF ID as well as Access Type of the PDU Session.

If the Request Type indicates "Existing PDU Session", the AMF selects the SMF based on SMF-ID received from UDM. The AMF updates the Access Type stored for the PDU session.

If the Request Type indicates "Existing PDU Session" referring to an existing PDU session moved between 3GPP access and non-3GPP access, then if the serving PLMN S-NSSAI of the PDU session is present in the Allowed NSSAI of the target access type, the PDU session establishment procedure can be performed in the following cases:
- the SMF ID corresponding to the PDU session ID and the AMF belong to the same PLMN;
- the SMF ID corresponding to the PDU session ID belongs to the HPLMN;

Otherwise the AMF shall reject the PDU session establishment request with an appropriate reject cause.

The AMF shall reject a request coming from an emergency registered UE and the Request Type indicates neither "Emergency Request" nor "Existing Emergency PDU Session".

(3) Step 3: If the AMF does not have an association with an SMF for the PDU session ID provided by the UE (e.g., when Request Type indicates "initial request"), the AMF invokes Create SM Context Request procedure (e.g., Nsmf_PDUSession_CreateSMContext Request). If the AMF already has an association with an SMF for the PDU session ID provided by the UE (e.g., when Request Type indicates "existing PDU Session"), the AMF invokes Update SM Context Request procedure (e.g., Nsmf_PDUSession_UpdateSMContext Request).

The AMF sends the S-NSSAI of the serving PLMN from the Allowed NSSAI to the SMF. For roaming scenario in local breakout (LBO), the AMF also sends the corresponding S-NSSAI of the HPLMN from the Mapping Of Allowed NSSAI to the SMF.

The AMF ID is the UE's GUAMI which uniquely identifies the AMF serving the UE. The AMF forwards the PDU session ID together with the N1 SM container containing the PDU Session Establishment Request message received from the UE. The generic public subscription identifier (GPSI) shall be included if available at AMF.

The AMF provides the PEI instead of the SUPI when the UE in limited service state has registered for emergency services without providing a SUPI. In case the UE in limited service state has registered for Emergency services with a SUPI but has not been authenticated, the AMF indicates that the SUPI has not been authenticated. The SMF determines that the UE has not been authenticated when it does not receive a SUPI for the UE or when the AMF indicates that the SUPI has not been authenticated.

The AMF may include a PCF ID in the Nsmf_PDUSession_CreateSMContext Request. This PCF ID identifies the home PCF (H-PCF) in the non-roaming case and the visited PCF (V-PCF) in the LBO roaming case.

(4) Step 4: If session management subscription data for corresponding SUPI, DNN and S-NSSAI of the HPLMN is not available, then SMF may retrieve the session management subscription data from the UDM and subscribes to be notified when this subscription data is modified.

(5) Step 5: The SMF transmits either Create SM Context Response message (e.g., Nsmf_PDUSession_CreateSMContext Response) or Update SM Context Response message (e.g., Nsmf_PDUSession_UpdateSMContext Response) to the AMF, depending on the request received in step 3.

If the SMF received Nsmf_PDUSession_CreateSMContext Request in step 3 and the SMF is able to process the PDU session establishment request, the SMF creates an SM context and responds to the AMF by providing an SM Context ID.

When the SMF decides to not accept to establish a PDU session, the SMF rejects the UE request via NAS SM signaling including a relevant SM rejection cause by responding to the AMF with Nsmf_PDUSession_CreateSMContext Response. The SMF also indicates to the AMF that the PDU session ID is to be considered as released, the SMF proceeds to step 20 below and the PDU session establishment procedure is stopped.

(6) Step 6: Optional secondary authentication/authorization may be performed.

(7a) Step 7a: If dynamic policy and charging control (PCC) is to be used for the PDU session, the SMF may perform PCF selection.

(7b) Step 7b: The SMF may perform an SM Policy Association Establishment procedure to establish an SM Policy association with the PCF and get the default PCC rules for the PDU session.

(8) Step 8: The SMF selects one or more UPFs.

(9) Step 9: The SMF may perform an SMF initiated SM Policy Association Modification procedure to provide information on the policy control request trigger condition(s) that have been met.

(10) Step 10: If Request Type indicates "initial request", the SMF may initiate an N4 Session Establishment procedure with the selected UPF. Otherwise, the SMF may initiate an N4 Session Modification procedure with the selected UPF In step 10a, the SMF may send an N4 Session Establishment/Modification Request to the UPF and provides packet detection, enforcement and reporting rules to be installed on the UPF for this PDU session. In step 10b, the UPF may acknowledge by sending an N4 Session Establishment/Modification Response.

(11) Step 11: The SMF transmits a N1N2Message Transfer message (e.g., Namf_Communication_N1N2MessageTransfer) to the AMF.

The N1N2Message Transfer message may include N2 SM information. The N2 SM information carries information that the AMF shall forward to the (R)AN which may include:

The CN Tunnel Info: Core network address(es) of the N3 tunnel corresponding to the PDU session;
One or multiple quality of service (QoS) profiles and the corresponding QoS flow IDs (QFIs);
The PDU session ID: indicate to the UE the association between (R)AN resources and a PDU session for the UE.

S-NSSAI with the value for the serving PLMN (i.e., the HPLMN S-NSSAI or, in LBO roaming case, the VPLMN S-NSSAI).
User Plane Security Enforcement information determined by the SMF.
If the User Plane Security Enforcement information indicates that integrity protection is "Preferred" or "Required", the SMF also includes the UE Integrity Protection Maximum Data Rate as received in the PDU Session Establishment Request message.
Redundancy sequence number (RSN) parameter The N1N2Message Transfer message may include N1 SM container. The N1 SM container contains the PDU Session Establishment Accept message that the AMF shall provide to the UE. The PDU Session Establishment Accept message includes S-NSSAI from the Allowed NSSAI. For LBO roaming scenario, the PDU Session Establishment Accept message includes the S-NSSAI from the Allowed NSSAI for the VPLMN and also it includes the corresponding S-NSSAI of the HPLMN from the Mapping Of Allowed NSSAI that SMF received in step 3.

Multiple QoS Rules, QoS flow level, QoS parameters if needed for the QoS Flow(s) associated with those QoS rule(s) and QoS Profiles may be included in the PDU Session Establishment Accept message within the N1 SM container and in the N2 SM information.

If the PDU session establishment failed anywhere between step 5 and step 11, then the N1N2Message Transfer message shall include the N1 SM container with a PDU Session Establishment Reject message and shall not include any N2 SM information. The (R)AN sends the NAS message containing the PDU Session Establishment Reject message to the UE. In this case, steps 12-17 are skipped.

(12) Step 12: The AMF sends the NAS message containing PDU Session ID and PDU Session Establishment Accept message targeted to the UE and the N2 SM information received from the SMF within the N2 PDU Session Request message to the (R)AN.

(13) Step 13: The (R)AN may issue AN specific signaling exchange with the UE that is related with the information received from SMF. For example, in case of a NG-RAN, an RRC connection reconfiguration may take place with the UE establishing the necessary NG-RAN resources related to the QoS rules for the PDU session request received in step 12.

The (R)AN forwards the NAS message (PDU Session ID, N1 SM container (PDU Session Establishment Accept message)) provided in step 12 to the UE. The (R)AN shall only provide the NAS message to the UE if the AN specific signaling exchange with the UE includes the (R)AN resource additions associated to the received N2 command.

If the N2 SM information is not included in the step 11, then the following steps 14 to 16b and step 17 are omitted.

Now, procedures of FIG. 9, which follow the procedures of FIG. 8, are described.

(14) Step 14: The (R)AN transmits a N2 PDU Session Response message to the AMF. The N2 PDU Session Response message may include PDU session ID, Cause, N2 SM information (PDU Session ID, AN Tunnel Info, List of accepted/rejected QFI(s), User Plane Enforcement Policy Notification)), etc.

(15) Step 15: The AMF transmits an Update SM Context Request message (e.g., Nsmf_PDUSession_UpdateSMContext Request) to the SMF. The AMF forwards the N2 SM information received from (R)AN to the SMF.

(16a) Step S16a: The SMF initiates an N4 Session Modification procedure with the UPF. The SMF provides AN Tunnel Info to the UPF as well as the corresponding forwarding rules.

(16b) Step S16b: The UPF provides an N4 Session Modification Response to the SMF.

After this step, the UPF may deliver any DL packets to the UE that may have been buffered for this PDU session.

(16c) Step 16c: If the SMF has not yet registered for this PDU session, then the SMF may register with the UDM for a given PDU Session.

(17) Step 17: The SMF transmits an Update SM Context Response message (e.g., Nsmf_PDUSession_UpdateSMContext Response) to the AMF.

After this step, the AMF forwards relevant events subscribed by the SMF.

(18) Step 18: If during the procedure, any time after step 5, the PDU session establishment is not successful, the SMF may inform the AMF by invoking Nsmf_PDUSession_SMContextStatusNotify (Release). The SMF may also release any N4 session(s) created, any PDU session address if allocated (e.g., IP address) and release the association with PCF, if any. In this case, step 19 is skipped.

(19) Step 19: In the case of PDU Session Type IPv6 or IPv4v6, the SMF may generate an IPv6 Router Advertisement and send it to the UE.

(20) Step 20: The SMF may perform SMF initiated SM Policy Association Modification.

(21) Step 21: If the PDU Session establishment failed after step 4, the SMF may unsubscribe to the modifications of session management subscription data, if the SMF is no more handling a PDU session of the UE.

Access traffic steering, switching and splitting (ATSSS) is described. Section 5.32 of 3GPP TS 23.501 V16.3.0 (2019-12) and/or Section 4.22 of 3GPP TS 23.502 V16.3.0 (2019-12) can be referred.

The ATSSS feature is an optional feature that may be supported by the UE and the 5GC network.

The ATSSS feature enables a multi-access PDU connectivity service, which can exchange PDUs between the UE and a data network by simultaneously using one 3GPP access network and one non-3GPP access network and two independent N3/N9 tunnels between the PDU session anchor (PSA) and RAN/AN. The multi-access PDU connectivity service is realized by establishing a multi-access PDU (MA PDU) session, i.e., a PDU session that may have user-plane resources on two access networks.

The UE may request a MA PDU session when the UE is registered via both 3GPP and non-3GPP accesses, or when the UE is registered via one access only.

After the establishment of a MA PDU session, and when there are user-plane resources on both access networks, the UE applies network-provided policy (i.e., ATSSS rules) and considers local conditions (such as network interface availability, signal loss conditions, user preferences, etc.) for deciding how to distribute the uplink traffic across the two access networks. Similarly, the UPF anchor of the MA PDU session applies network-provided policy (i.e., N4 rules) and feedback information received from the UE via the user-plane (such as access network Unavailability or Availability) for deciding how to distribute the downlink traffic across the two N3/N9 tunnels and two access networks. When there are user-plane resources on only one access network, the UE applies the ATSSS rules and considers local conditions for triggering the establishment or activation of the user plane resources over another access.

The type of a MA PDU session may be one of the following types: IPv4, IPv6, IPv4v6, and Ethernet. The Unstructured type may not be supported.

The ATSSS feature can be supported over any type of access network, including untrusted and trusted non-3GPP access networks, wireline 5G access networks, etc., as long as a MA PDU session can be established over this type of access network.

The signaling flow for a MA PDU session establishment when the UE is not roaming, or when the UE is roaming and the PSA is located in the VPLMN, is based on the signaling flow of the PDU Session Establishment procedure described above in FIGS. 8 and 9, with the following differences and clarifications:

(1) The PDU Session Establishment Request message may be sent over the 3GPP access or over the non-3GPP access. In the steps below, it is assumed that it is sent over the 3GPP access, unless otherwise specified.

(2) In step 1, the UE provides a "MA PDU Request" indication in UL NAS Transport message and an ATSSS Capability (e.g., an "MPTCP Capability" and/or an "ATSSS-LL Capability") in PDU Session Establishment Request message.

The "MA PDU Request" indication and the Request Type="initial request" indicate to the network that this PDU session establishment request is to establish a new MA PDU session and to apply the ATSSS low-layer (LL) functionality, or the multi-path TCP protocol (MPTCP) functionality, or both functionalities, for steering the traffic of this MA PDU session.

If the UE requests an S-NSSAI and the UE is registered over both accesses, it shall request an S-NSSAI that is allowed on both accesses.

(3) In step 2, if the AMF supports MA PDU sessions, then the AMF selects an SMF, which supports MA PDU sessions.

(4) In step 3, the AMF informs the SMF that the request is for a MA PDU session (i.e., it includes an "MA PDU Request" indication) and, in addition, it indicates to SMF whether the UE is registered over both accesses. If the AMF determines that the UE is registered via both accesses but the requested S-NSSAI is not allowed on both accesses, then the AMF shall reject the MA PDU session establishment.

(5) In step 4, the SMF retrieves, via session management subscription data, the information whether the MA PDU session is allowed or not.

(6) In step 7, if dynamic PCC is to be used for the MA PDU Session, the SMF sends an "MA PDU Request" indication to the PCF in the SM Policy Control Create message and ATSSS Capability. The PCF decides whether the MA PDU session is allowed or not based on operator policy and subscription data and provides ATSSS steering policy.

The PCF provides PCC rules for the MA PDU session, i.e., PCC rules that include ATSSS policy control information. From the received PCC rules, the SMF derives (a) ATSSS rules, which will be sent to UE for controlling the traffic steering, switching and splitting in the uplink direction, and (b) N4 rules, which will be sent to UPF for controlling the traffic steering, switching and splitting in the downlink direction. If the UE indicates the support of "ATSSS-LL Capability", the SMF may derive the measurement assistance information.

If the SMF receives a UP security policy for the PDU session with integrity protection set to "Required" and the MA PDU session is being established over non-3GPP access, the SMF does not verify whether the access can satisfy the UP security policy.

(7) In the remaining steps of the PDU Session Establishment procedure described above in FIGS. 8 and 9, the SMF establishes the user-plane resources over the 3GPP access, i.e., over the access where the PDU Session Establishment Request message was sent on:

In step 10, the N4 rules derived by SMF for the MA PDU session are sent to UPF and two N3 UL CN tunnels info are allocated by the SMF or by the UPF. If the ATSSS Capability for the MA PDU Session indicates "ATSSS-LL Capability", the SMF may include information for measurement into the N4 rule to instruct the UPF to initiate performance measurement for this MA PDU Session. In step 10a, the UPF allocates addressing information for the performance measurement function (PMF) in the UPF. In step 10b, the UPF sends the addressing information for the PMF in the UPF to the SMF.

In step 11, for the MA PDU session, the SMF includes an "MA PDU session Accepted" indication in the Namf_Communication_N1N2MessageTransfer message to the AMF and indicates to AMF that the N2 SM information included in this message should be sent over 3GPP access. The AMF marks this PDU session as MA PDU session based on the received "MA PDU session Accepted" indication.

In step 13, the UE receives a PDU Session Establishment Accept message, which indicates to UE that the requested MA PDU session was successfully established. This message includes the ATSSS rules for the MA PDU session, which were derived by SMF. If the ATSSS Capability for the MA PDU Session indicates "ATSSS-LL Capability", the SMF may include the addressing information of PMF in the UPF into the measurement assistance Information.

After step 18 of the PDU Session Establishment procedure described above in FIGS. 8 and 9, if the SMF was informed in step 2 that the UE is registered over both accesses, then the SMF initiates the establishment of user-plane resources over non-3GPP access too. The SMF sends an N1N2 Message Transfer to AMF including N2 SM information and indicates to AMF that the N2 SM information should be sent over non-3GPP access. The N1N2 Message Transfer does not include an N1 SM Container for the UE because this was sent to UE in step 13. After this step, the two N3 tunnels between the PSA and RAN/AN are established.

The last step above is not executed when the UE is registered over one access only, in which case the MA PDU Session is established with user-plane resources over one access only.

Support of non-3GPP access is described. Section 4.2.8.1 of 3GPP TS 23.501 V16.3.0 (2019-12) can be referred.

Figure 10:
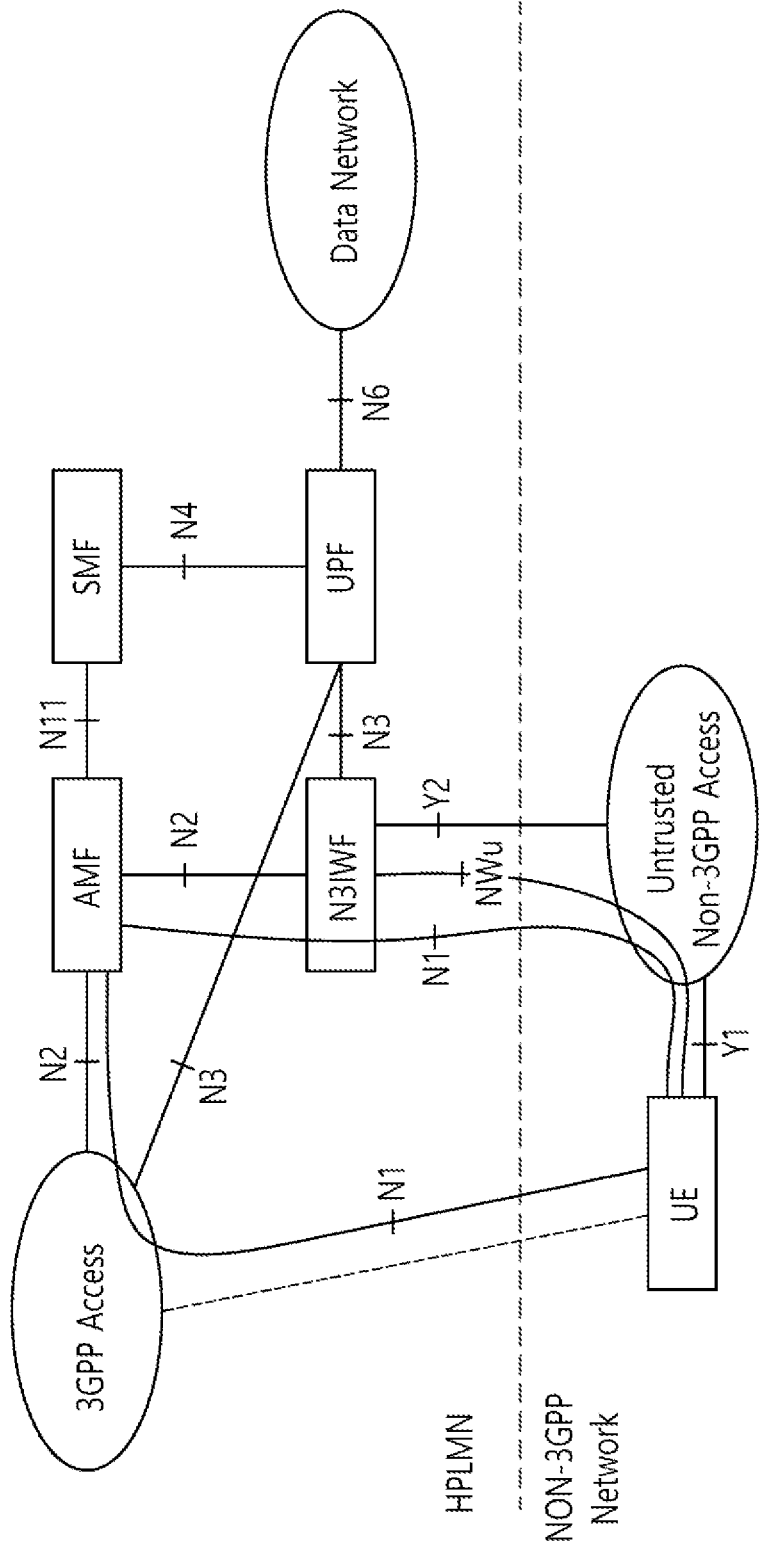
FIG. 10 shows an example of non-roaming architecture for 5GC with untrusted non-3GPP access to which implementations of the present disclosure is applied.

FIG. 10 shows an example of non-roaming architecture for 5GC with untrusted non-3GPP access to which implementations of the present disclosure is applied.

The 5G Core Network supports connectivity of UEs via non-3GPP access networks, e.g., wireless local area network (WLAN) access networks.

The 5G Core Network supports both untrusted non-3GPP access networks and trusted non-3GPP access networks (TNANs).

An untrusted non-3GPP access network shall be connected to the 5G Core Network via a N3IWF, whereas a trusted non-3GPP access network shall be connected to the 5G Core Network via a TNGF. Both the N3IWF and the TNGF interface with the 5G Core Network CP and UP functions via the N2 and N3 interfaces, respectively.

A non-3GPP access network may advertise the PLMNs for which it supports trusted connectivity and the type of supported trusted connectivity (e.g., "5G connectivity"). Therefore, the UEs can discover the non-3GPP access networks that can provide trusted connectivity to one or more PLMNs.

When the UE decides to use untrusted non-3GPP access to connect to a 5G Core Network in a PLMN:
the UE first selects and connects with a non-3GPP access network; and then
the UE selects a PLMN and an N3IWF in this PLMN. The PLMN/N3IWF selection and the non-3GPP access network selection are independent.

When the UE decides to use trusted non-3GPP access to connect to a 5G Core Network in a PLMN:
the UE first selects a PLMN; and then
the UE selects a non-3GPP access network (a TNAN) that supports trusted connectivity to the selected PLMN. In this case, the non-3GPP access network selection is affected by the PLMN selection.

A UE that accesses the 5G Core Network over a standalone non-3GPP access shall, after UE registration, support NAS signaling with 5G Core Network control-plane functions using the N1 reference point.

When a UE is connected via a NG-RAN and via a standalone non-3GPP access, multiple N1 instances shall exist for the UE, i.e., there shall be one N1 instance over NG-RAN and one N1 instance over non-3GPP access.

A UE simultaneously connected to the same 5G Core Network of a PLMN over a 3GPP access and a non-3GPP access shall be served by a single AMF in this 5G Core Network.

When a UE is connected to a 3GPP access of a PLMN, if the UE selects a N3IWF and the N3IWF is located in a PLMN different from the PLMN of the 3GPP access, e.g., in a different VPLMN or in the HPLMN, the UE is served separately by the two PLMNs. The UE is registered with two separate AMFs. PDU sessions over the 3GPP access are served by V-SMFs different from the V-SMF serving the PDU Sessions over the non-3GPP access. The same can be true when the UE uses trusted non-3GPP access, i.e., the UE may select one PLMN for 3GPP access and a different PLMN for trusted non-3GPP access.

The PLMN selection for the 3GPP access does not depend on the PLMN that is used for non-3GPP access. In other words, if a UE is registered with a PLMN over a non-3GPP access, the UE performs PLMN selection for the 3GPP access independently of this PLMN.

A UE shall establish an IPsec tunnel with the N3IWF or with the TNGF in order to register with the 5G Core Network over non-3GPP access.

It shall be possible to maintain the UE NAS signaling connection with the AMF over the non-3GPP access after all the PDU sessions for the UE over that access have been released or handed over to 3GPP access.

N1 NAS signaling over standalone non-3GPP accesses shall be protected with the same security mechanism applied for N1 over a 3GPP access.

Stand-alone non-public network (SNPN) is described. Section 5.30.2 of 3GPP TS 23.501 V16.3.0 (2019-12) can be referred.

An SNPN is operated by an NPN operator and not relying on network functions provided by a PLMN. On the other hand, a public network integrated (PNI) NPN is a non-public network deployed with the support of a PLMN.

SNPN 5GS deployments are based on the architecture depicted above in FIG. 5, the architecture for 5GC with untrusted non-3GPP access, described above in FIG. 10, for access to SNPN services via a PLMN (and vice versa) and the additional functionality described below.

Interworking with EPS is not supported for SNPN.

The combination of a PLMN ID and network identifier (NID) identifies an SNPN.

The NID shall support two assignment models:

Self-assignment: NIDs are chosen individually by SNPNs at deployment time (and may therefore not be unique) but use a different numbering space than the coordinated assignment NIDs.

Coordinated assignment: NIDs are assigned using one of the following two options:

1) The NID is assigned such that it is globally unique independent of the PLMN ID used; or 2) The NID is assigned such that the combination of the NID and the PLMN ID is globally unique.

An optional human-readable network name helps to identify an SNPN during manual SNPN selection.

When a UE is set to operate in SNPN access mode, the UE does not perform normal PLMN selection procedures.

UEs operating in SNPN access mode read the available PLMN IDs and list of available NIDs from the broadcast system information and take them into account during network selection.

For automatic network selection, the UE selects and attempts to register with the available SNPN identified by a PLMN ID and NID for which the UE has SUPI and credentials.

For manual network selection, UEs operating in SNPN access mode provide to the user the list of NIDs and related human-readable names (if available) of the available SNPNs the UE has respective SUPI and credentials for.

When a UE performs initial registration to an SNPN, the UE shall indicate the selected NID and the corresponding PLMN ID to NG-RAN. NG-RAN shall inform the AMF of the selected PLMN ID and NID.

To access PLMN services, a UE in SNPN access mode that has successfully registered with an SNPN may perform another registration via the SNPN user plane with a PLMN (using the credentials of that PLMN) following the same architectural principles as specified above for the non-3GPP access and the SNPN taking the role of "Untrusted non-3GPP access" in FIG. 10.

To access SNPN services, a UE that has successfully registered with a PLMN may perform another registration via the PLMN user plane with an SNPN (using the credentials of that SNPN) following the same architectural principles as specified above for the non-3GPP access and the PLMN taking the role of "Untrusted non-3GPP access" in FIG. 10.

Further enhancement of NPN is being discussed. One of the objectives for further enhancement of NPN is to support data forwarding between PLMN and SNPN to reduce data loss.

For example, data forwarding between PLMN and SNPN for service continuity may be considered in a case where NPN supports video, imaging and audio for professional applications (VIAPA). In this case, it may be addressed whether there are support for service continuity (assuming PSA may reside in either PLMN or in the NPN) between PLMN and NPN (SNPN or PNI-NPN) with overlapping radio coverage areas. The data service from NPN can be with low latency and high data rate service while serving massive number of UEs in a small area, e.g., the integrated audience multicast service in large live production events, such as music festivals.

When a UE receiving VIAPA services via the SNPN moves to the PLMN, the UE should register with PLMN, establish PDU sessions, and then register again via SNPN's N3IWF, and then perform handover of PDU sessions that provided the VIAPA services. This can lead to unnecessary latency until the UE is served again via the PLMN, thus undermining the user experience.

How to support service continuity between the PLMN and SNPN may need to be addressed.

According to implementations of the present disclosure, in order to support the service continuity between the PLMN and SNPN, the UE may request to the UPF of the source network to establish the MA PDU session via the NG-RAN of the source network and the N3IWF of the source network. In this case, the MA PDU session established via the N3IWF of the source network may correspond to UP connection for backup of the corresponding MA PDU session in preparation for the movement of the UE.

According to implementations of the present disclosure, the N3IWF of the source network and/or the UPF of the source network may buffer the received DL data to be transmitted to the UE. When the UE receiving VIAPA services by using the UP connection established via the NG-RAN of the source network is to be moved to the target network, the UE may deactivate the UP connection established via the NG-RAN of the source network, and may request to the UPF of the source network for activating the UP connection established via the N3IWF of the source network. When the UE moving to the target network re-accesses to the N3IWF of the source network via NG-RAN and/or 5GC of the target network, the buffered DL data may be delivered to the UE, thereby VIAPA services can be served continuously while minimizing data loss.

According to implementations of the present disclosure, the source network mentioned above may be a PLMN and the target network mentioned above may be a SNPN. Or, the source network mentioned above may be a SNPN and the target network mentioned above may be a PLMN.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 11:
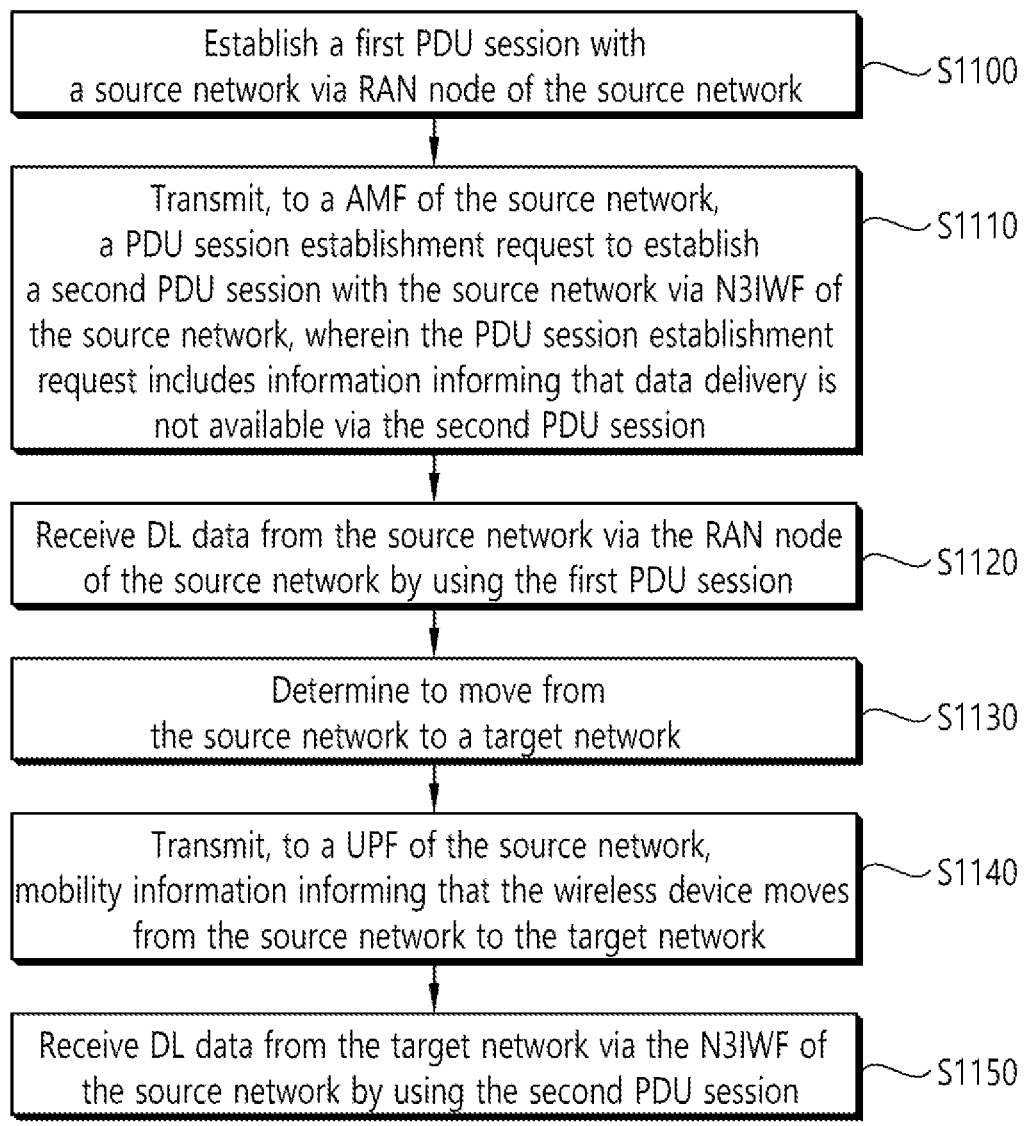
FIG. 11 shows an example of a method performed by a wireless device to which implementations of the present disclosure is applied.

FIG. 11 shows an example of a method performed by a wireless device to which implementations of the present disclosure is applied.

In step S1100, the wireless device establishes a first PDU session with a source network via a RAN node of the source network.

In step S1110, the wireless device transmits, to an AMF of the source network, a PDU session establishment request to establish a second PDU session with the source network via a N3IWF of the source network, wherein the PDU session establishment request includes information informing that data delivery is not available via the second PDU session.

In step S1120, the wireless device receives DL data from the source network via the RAN node of the source network by using the first PDU session.

In step S1130, the wireless device determines to move from the source network to a target network.

In step S1140, the wireless device transmits, to a UPF of the source network, mobility information informing that the wireless device moves from the source network to the target network.

In step S1150, the wireless device receives DL data from the target network via the N3IWF of the source network by using the second PDU session.

In some implementations, the source network may be a PLMN, and the target network may be a SNPN. Alternatively, the source network may be an SNPN, and the target network may be a PLMN.

In some implementations, the mobility information may indicate that data delivery is not available via the first PDU session. The mobility information may indicate that data delivery is available via the second PDU session. The mobility information may be forwarded to the N3IWF of the source network via a SMF of the source network.

In some implementations, the first PDU session and the second PDU session may correspond to a MA PDU session.

In some implementations, the wireless device may be in communication with at least one of a mobile device, a network, and/or autonomous vehicles other than the wireless device.

Furthermore, the method in perspective of the wireless device described above in FIG. 11 may be performed by the first wireless device 100 shown in FIG. 2, the wireless device 100 shown in FIG. 3, and/or the UE 100 shown in FIG. 4.

More specifically, the wireless device comprises at least one transceiver, at least one processor, and at least one computer memory operably connectable to the at least one processor and storing instructions that, based on being executed by the at least one processor, perform operations below.

The operations comprise establishing a first PDU session with a source network via a RAN node of the source network.

The operations comprise transmitting, to an AMF of the source network, a PDU session establishment request to establish a second PDU session with the source network via a N3IWF of the source network, wherein the PDU session establishment request includes information informing that data delivery is not available via the second PDU session.

The operations comprise receiving DL data from the source network via the RAN node of the source network by using the first PDU session.

The operations comprise determining to move from the source network to a target network.

The operations comprise transmitting, to a UPF of the source network, mobility information informing that the wireless device moves from the source network to the target network.

The operations comprise receiving DL data from the target network via the N3IWF of the source network by using the second PDU session.

In some implementations, the source network may be a PLMN, and the target network may be a SNPN. Alternatively, the source network may be an SNPN, and the target network may be a PLMN.

In some implementations, the mobility information may indicate that data delivery is not available via the first PDU session. The mobility information may indicate that data delivery is available via the second PDU session. The mobility information may be forwarded to the N3IWF of the source network via a SMF of the source network.

In some implementations, the first PDU session and the second PDU session may correspond to a MA PDU session.

Furthermore, the method in perspective of the wireless device described above in FIG. 11 may be performed by control of the processor 102 included in the first wireless device 100 shown in FIG. 2, by control of the communication unit 110 and/or the control unit 120 included in the wireless device 100 shown in FIG. 3, and/or by control of the processor 102 included in the UE 100 shown in FIG. 4.

More specifically, an apparatus operating in a wireless communication system (e.g., wireless device) comprises at least one processor, and at least one computer memory operably connectable to the at least one processor. The at least one processor is configured to perform operations comprising: establishing a first PDU session with a source network via a radio access network (RAN) node of the source network; generating a PDU session establishment request to establish a second PDU session with the source network via a N3IWF of the source network, wherein the PDU session establishment request includes information informing that data delivery is not available via the second PDU session; obtaining DL data from the source network via the RAN node of the source network by using the first PDU session; determining to move from the source network to a target network; generating mobility information informing that the wireless device moves from the source network to the target network; and obtaining DL data from the target network via the N3IWF of the source network by using the second PDU session.

Furthermore, the method in perspective of the wireless device described above in FIG. 11 may be performed by a software code 105 stored in the memory 104 included in the first wireless device 100 shown in FIG. 2.

The technical features of the present disclosure may be embodied directly in hardware, in a software executed by a processor, or in a combination of the two. For example, a method performed by a wireless device in a wireless communication may be implemented in hardware, software, firmware, or any combination thereof. For example, a software may reside in RAM, flash memory, ROM, EPROM, EEPROM, registers, hard disk, a removable disk, a CD-ROM, or any other storage medium.

Some example of storage medium may be coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include RAM such as synchronous dynamic random access memory (SDRAM), ROM, non-volatile random access memory (NVRAM), EEPROM, flash memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some implementations of the present disclosure, a non-transitory computer-readable medium (CRM) has stored thereon a plurality of instructions.

More specifically, at least one CRM stores instructions that, based on being executed by at least one processor, perform operations comprising: establishing a first PDU session with a source network via a radio access network (RAN) node of the source network; generating a PDU session establishment request to establish a second PDU session with the source network via a N3IWF of the source network, wherein the PDU session establishment request includes information informing that data delivery is not available via the second PDU session; obtaining DL data from the source network via the RAN node of the source network by using the first PDU session; determining to move from the source network to a target network; generating mobility information informing that the wireless device moves from the source network to the target network; and obtaining DL data from the target network via the N3IWF of the source network by using the second PDU session.

Figure 12:
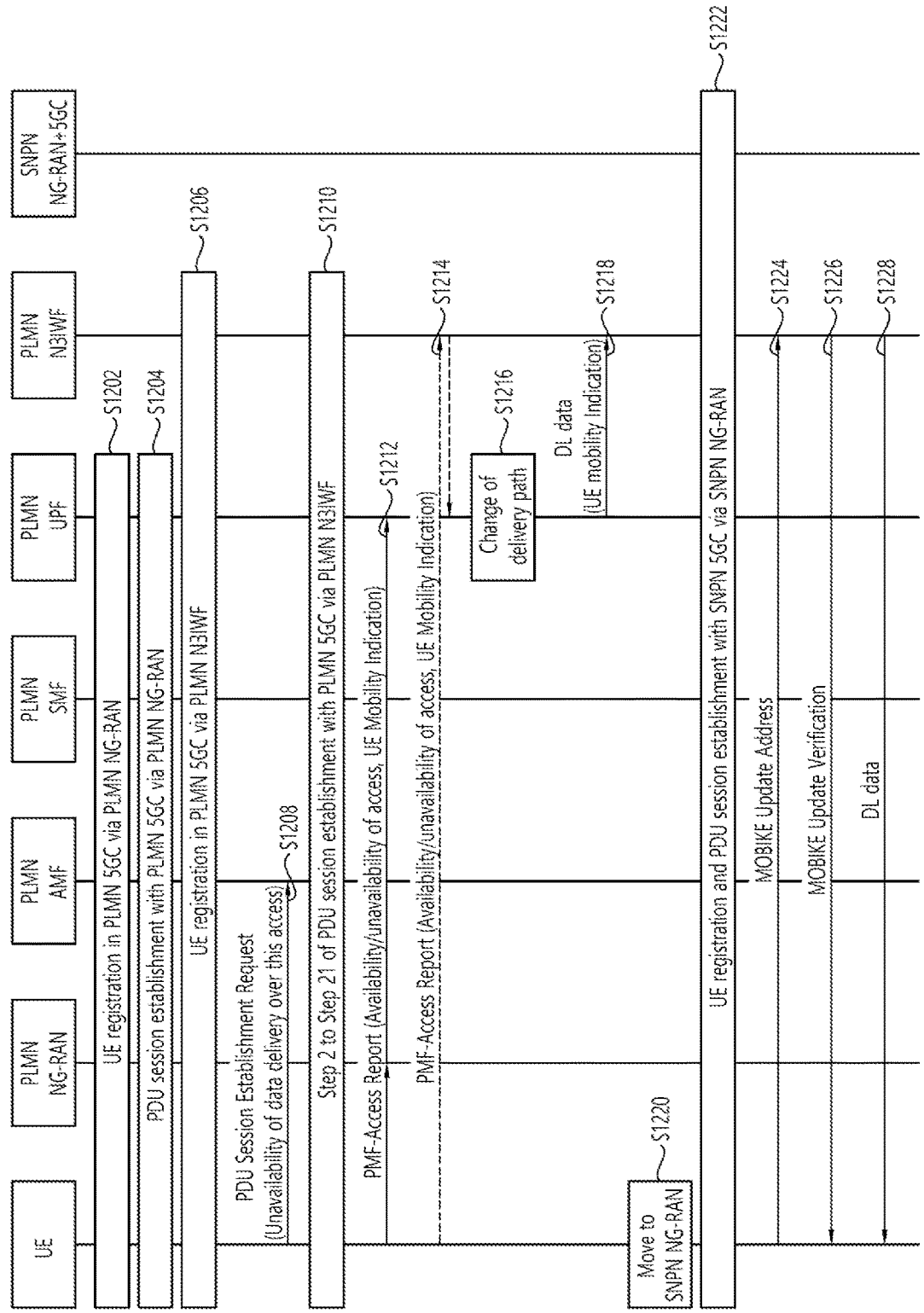
FIG. 12 shows an example of a procedure for service continuity between PLMN and SNPN using MA PDU session with N3IWF data buffering to which implementations of the present disclosure.

FIG. 12 shows an example of a procedure for service continuity between PLMN and SNPN using MA PDU session with N3IWF data buffering to which implementations of the present disclosure.

In step S1202, the UE may register in the PLMN. The registration procedure described above in FIGS. 6 and 7 may be performed for this step.

In step S1204, the UE may establish a MA PDU session to receive PLMN network services via PLMN NG-RAN. The PDU session establishment procedure described above in FIGS. 8 and 9 may be performed for this step. Furthermore, the differences and clarifications regarding the MA PDU session establishment described above, compared to the signaling flow of the PDU Session Establishment procedure described above in FIGS. 8 and 9, may be applied as well.

In step S1206, in order to support service continuity between the PLMN and SNPN, the UE may also perform registration in the PLMN via the PLMN N3IWF (i.e., non-3GPP access) with the 5G-GUTI which was given to the UE when registering in the PLMN in step S1202.

It may be assumed that the UE is in the non-3GPP access coverage. However, if it is not possible, the UE may use PDU session of the PLMN to access the PLMN N3IWF.

In step S1208, the UE may provide a "MA PDU Request" indication in UL NAS Transport message and an ATSSS Capability (e.g., an "MPTCP Capability" and/or an "ATSSS-LL Capability") in PDU Session Establishment Request message. This step may correspond to step 1 of the PDU Session Establishment procedure described above in FIG. 8.

The UE may also include information on the "unavailability of data delivery via N3IWF" in the PDU Session Establishment Request message. The information on the "unavailability of data delivery via N3IWF" may indicate to the PLMN SMF that the data delivery is not available via the PLMN N3IWF. This information may enable the PLMN SMF to establish and maintain the MA PDU sessions via the PLMN NG-RAN and the PLMN N3IWF and to continuously send the DL data via the PLMN NG-RAN only.

Alternatively, information on the "unavailability of data delivery via N3IWF" may be delivered to the PLMN SMF in step S1204. Alternatively, the UE may send existing access report with unavailable indication of PLMN N3IWF tunnel (i.e., unavailability of non-3GPP access) to the PLMN UPF via user plane to prevent sending data via the PLMN N3IWF. The existing access report with unavailable indication may be sent after step S1204 or step S1210.

In step S1210, step 2 to step 21 of the PDU Session Establishment procedure described above in FIGS. 8 and 9 may be performed.

In step S1208 and S1210, the differences and clarifications regarding the MA PDU session establishment described above, compared to the signaling flow of the PDU Session Establishment procedure described above in FIGS. 8 and 9, may be applied as well.

When the PLMN SMF received PDU Session Establishment Request with the information on the "unavailability of data delivery via N3IWF", the PLMN SMF may forward this information to the PLMN UPF that is associated with the PDU session ID the UE provided. Based on this information, although the PLMN UPF establishes the user-plane resources over the PLMN N3IWF, the PLMN UPF may regard the DL tunnel via the PLMN N3IWF as unavailable so that the DL data is sent to the UE via only PLMN NG-RAN.

In step S1212, when the UE detects the need to move to the SNPN NG-RAN from the PLMN NG-RAN, the UE may send PMF-Access Report to the PLMN UPF via the user plane of the PLMN NG-RAN of the MA PDU session.

The PMF-Access Report may include information on availability and/or unavailability of access. The information on availability and/or unavailability of access may indicate to the PLMN UPF that the data delivery path via the PLMN N3IWF is now available, whereas the data delivery path via the PLMN NG-RAN is not available.

Furthermore, the PMF-Access Report may include UE mobility indication. The UE mobility indication may indicate to the PLMN UPF that the UE prepares to move to the SNPN NG-RAN from the PLMN NG-RAN. If the PLMN UPF receives the UE mobility indication, the PLMN UPF may notify to the PLMN SMF. The PLMN SMF may send N2 SM Message to the PLMN N3IWF to start buffering DL data.

Alternatively, the UE may send such indication via signaling to the PLMN SMF (by using PDU Session Modification) and/or PLMN N3IWF (by using IKE signaling). Optionally, the PLMN SMF may provide buffering time value to the PLMN N3IWF.

In step S1214, the UE may send the PMF-Access Report via the user plane of the PLMN N3IWF of the MA PDU session.

Additionally and/or alternatively, the UE may report to the PLMN UPF that the data delivery path via the PLMN NG-RAN is also available. For example, since the UE has 2 Rx antennas and the radio quality via the PLMN NG-RAN is still enough to receive PLMN service, the UE may try to receive PLMN service via the PLMN NG-RAN and PLMN N3IWF concurrently.

In step S1216, based on the report from the UE, the PLMN UPF may decide that the user plane of the PLMN N3IWF can be used to deliver the DL data. Therefore, the data delivery path is changed.

In step S1218, if the UE mobility indication received in step S1214 and/or S1216 is not forwarded to the PLMN N3IWF, the PLMN UPF may forward the UE mobility indication to the PLMN N3IWF with the DL data by using GTP-U header. Since the UE mobility indication may enable the PLMN N3IWF to be aware of the UE mobility, the PLMN N3IWF can wait for the UE re-access without the data discard. In other words, DL data is buffered in the PLMN N3IWF.

In step S1220, the UE may move to the SNPN NG-RAN from the PLMN NG-RAN.

In step S1222, the UE may register in the SNPN. The registration procedure described above in FIGS. 6 and 7 may be performed for this step. Furthermore, the UE may establish a PDU session to receive SNPN network services. The PDU session establishment procedure described above in FIGS. 8 and 9 may be performed for this step.

In step S1224, the UE may initiate IPSec tunnel update procedure by sending the MOBIKE update address message.

In step S1226, the PLMN N3IWF may send MOBIKE Address Verification message to the UE.

In step S1228, the PLMN N3IWF may send the buffered DL data to the UE.

Figure 13:
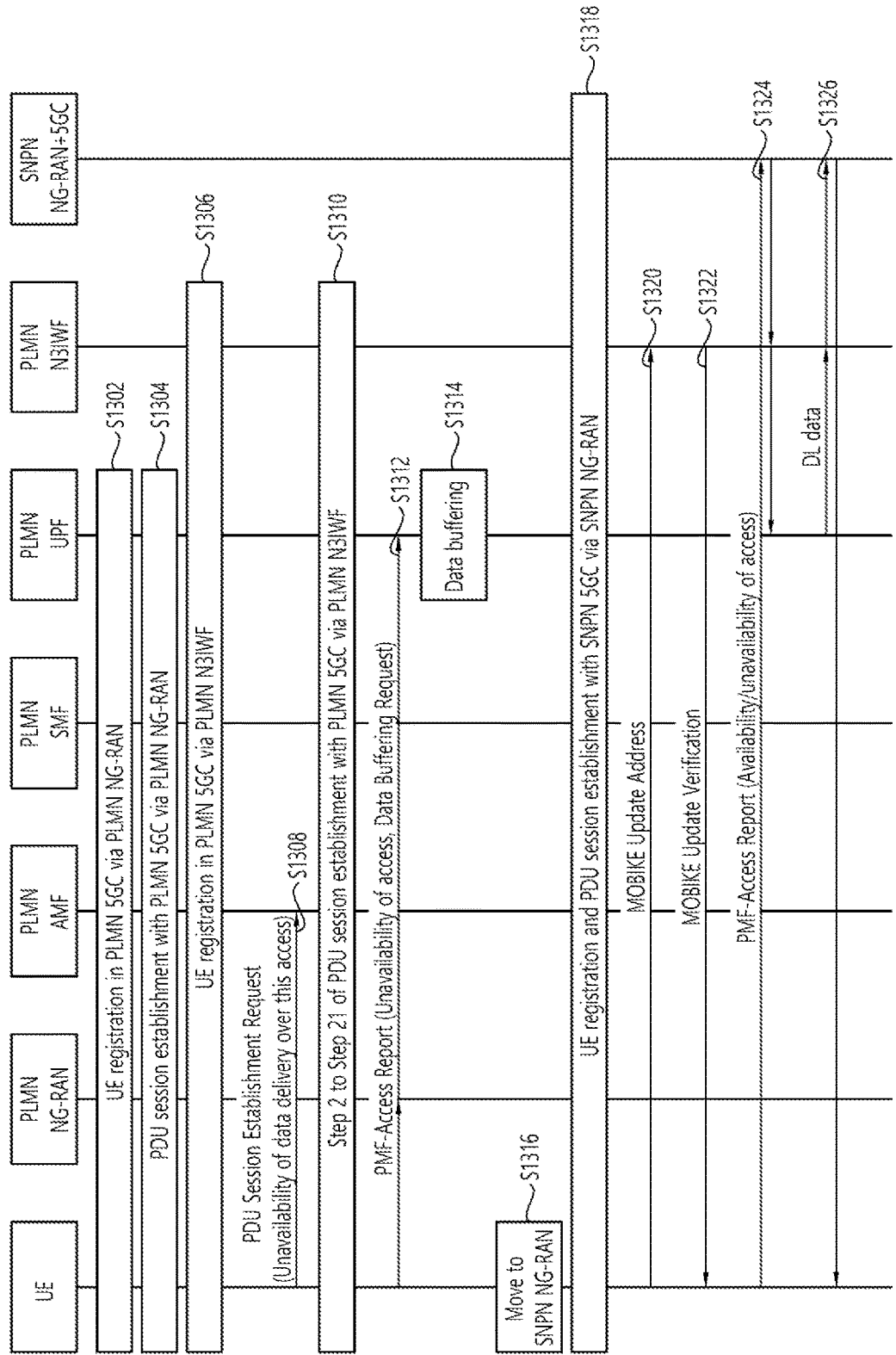
FIG. 13 shows an example of a procedure for service continuity between PLMN and SNPN using MA PDU session with UPF data buffering to which implementations of the present disclosure.

FIG. 13 shows an example of a procedure for service continuity between PLMN and SNPN using MA PDU session with UPF data buffering to which implementations of the present disclosure.

In step S1302, the UE may register in the PLMN. The registration procedure described above in FIGS. 6 and 7 may be performed for this step.

In step S1304, the UE may establish a MA PDU session to receive PLMN network services via PLMN NG-RAN. The PDU session establishment procedure described above in FIGS. 8 and 9 may be performed for this step. Furthermore, the differences and clarifications regarding the MA PDU session establishment described above, compared to the signaling flow of the PDU Session Establishment procedure described above in FIGS. 8 and 9, may be applied as well.

In step S1306, in order to support service continuity between the PLMN and SNPN, the UE may also perform registration in the PLMN via the PLMN N3IWF (i.e., non-3GPP access) with the 5G-GUTI which was given to the UE when registering in the PLMN in step S1302.

It may be assumed that the UE is in the non-3GPP access coverage. However, if it is not possible, the UE may use PDU session of the PLMN to access the PLMN N3IWF.

In step S1308, the UE may provide a "MA PDU Request" indication in UL NAS Transport message and an ATSSS Capability (e.g., an "MPTCP Capability" and/or an "ATSSS-LL Capability") in PDU Session Establishment Request message. This step may correspond to step 1 of the PDU Session Establishment procedure described above in FIG. 8.

The UE may also include information on the "unavailability of data delivery via N3IWF" in the PDU Session Establishment Request message. The information on the "unavailability of data delivery via N3IWF" may indicate to the PLMN SMF that the data delivery is not available via the PLMN N3IWF. This information may enable the PLMN SMF to establish and maintain the MA PDU sessions via the PLMN NG-RAN and the PLMN N3IWF and to continuously send the DL data via the PLMN NG-RAN only.

Alternatively, information on the "unavailability of data delivery via N3IWF" may be delivered to the PLMN SMF in step S1304. Alternatively, the UE may send existing access report with unavailable indication of PLMN N3IWF tunnel (i.e., unavailability of non-3GPP access) to the PLMN UPF via user plane to prevent sending data via the PLMN N3IWF. The existing access report with unavailable indication may be sent after step S1304 or step S1310.

In step S1310, step 2 to step 21 of the PDU Session Establishment procedure described above in FIGS. 8 and 9 may be performed.

In step S1308 and S1310, the differences and clarifications regarding the MA PDU session establishment described above, compared to the signaling flow of the PDU Session Establishment procedure described above in FIGS. 8 and 9, may be applied as well.

When the PLMN SMF received PDU Session Establishment Request with the information on the "unavailability of data delivery via N3IWF", the PLMN SMF may forward this information to the PLMN UPF that is associated with the PDU session ID the UE provided. Based on this information, although the PLMN UPF establishes the user-plane resources over the PLMN N3IWF, the PLMN UPF may regard the DL tunnel via the PLMN N3IWF as unavailable so that the DL data is sent to the UE via only PLMN NG-RAN.

In step S1312, when the UE detects the need to move to the SNPN NG-RAN from the PLMN NG-RAN, the UE may send PMF-Access Report to the PLMN UPF via the user plane of the PLMN NG-RAN of the MA PDU session.

The PMF-Access Report may include information informing the PLMN UPF that both data delivery paths via the PLMN NG-RAN and PLMN N3IWF are not available.

Furthermore, the PMF-Access Report may include data buffering request indication. The data buffering request indication may request the data buffering to the PLMN UPF, since the UE prepares to move to the SNPN NG-RAN and both data delivery paths are not available.

The UE may send the PMF-Access Report via the user plane of the PLMN N3IWF of the MA PDU session.

In step S1314, based on the report and indication from the UE, the PLMN UPF may decide to buffer the DL data. In other words, DL data is buffered in the PLMN UPF. Based on the UE report that both data delivery paths are not available, the PLMN UPF may decide to buffer the DL data without the explicit indication from the UE.

In step S1316, the UE may move to the SNPN NG-RAN from the PLMN NG-RAN.

In step S1318, the UE may register in the SNPN. The registration procedure described above in FIGS. 6 and 7 may be performed for this step. Furthermore, the UE may establish a PDU session to receive SNPN network services. The PDU session establishment procedure described above in FIGS. 8 and 9 may be performed for this step.

In step S1320, the UE may initiate IPSec tunnel update procedure by sending the MOBIKE update address message.

In step S1322, the PLMN N3IWF may send MOBIKE Address Verification message to the UE.

In step S1324, the UE may send PMF-Access Report to the PLMN UPF via the user plane of PLMN N3IWF of the MA PDU session. The PMF-Access Report may include information informing to the PLMN UPF that the data delivery path via the PLMN N3IWF is now available.

In step S1326, the PLMN UPF may send the buffered DL data to the UE via the PLMN N3IWF.

In the procedures described in FIGS. 12 and, 13, a case of handover from the PLMN to the SNPN for receiving PLMN service via SNPN is assumed. However, it is only exemplary and the present disclosure is not limited thereto. The similar procedure may be used when the UE is handed over from the SNPN to the PLMN for receiving SNPN service via PLMN. That is, the present disclosure may be also applied to support service continuity from the SNPN NG-RAN to PLMN NG-RAN.

Meanwhile, instead of establishing a MA PDU session first in the PLMN, the UE may establish a MA PDU session via PDU session of the SNPN (i.e., over non-3GPP access of the PLMN) first with an indication that access is not available and/or UE mobility indication. After establishing the MA PDU session, the UE may add a 3GPP access to the PDU session via the PLMN NG-RAN. When the UE needs to move from the PLMN NG-RAN to the SNPN NG-RAN, the UE may send unavailability report over 3GPP access (i.e., via the PLMN NG-RAN) and after moving to the SNPN NG-RAN, the UE may send availability report over non-3GPP access (i.e., via the SNPN NG-RAN). During the mobility period, data may be buffered in the PLMN N3IWF or PLMN UPF as described above.

The present disclosure may have various advantageous effects.

For example, since there is no setup for indirect data forwarding tunnel and the UE easily initiates to change the data delivery path without a specific control plane signaling exchange, the DL data can be delivered to the UE quickly.

For example, by creating a backup UP connection in advance in case the UE moves between SNPN and PLMN, VIAPA services can be quickly provided to users by reducing the process required to handover PDU sessions that provide VIAPA services.

For example, it can be avoided to prevent disrupting user experience.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device configured to operate in a wireless communication system, the method comprising:
    performing a first registration with a source network via a radio access network (RAN) node of the source network;
    performing a first protocol data unit (PDU) session establishment with the source network via the RAN node of the source network for establishing a multi-access PDU (MA PDU) session;
    performing a second registration with the source network via a non-3GPP interworking function (N3IWF) of the source network;
    performing a second PDU session establishment with the source network via the N3IWF of the source network for establishing the MA PDU session;
    wherein the second PDU session establishment comprises: transmitting a PDU session establishment request message which includes i) a MA PDU request indication for the MA PDU session, and ii) information informing that data delivery is not available via the N3IWF of the source network;
    receiving downlink (DL) data from the source network via the RAN node of the source network based on the MA PDU session;
    determining to move from the source network to a target network;
    transmitting, to a user plane function (UPF) of the source network, mobility information informing that the wireless device moves from the source network to the target network; and
    receiving DL data from the target network via the N3IWF of the source network.

2. The method of claim 1, wherein the source network is a public land mobile network (PLMN), and
    wherein the target network is a stand-alone non-public network (SNPN).

3. The method of claim 1, wherein the source network is an SNPN, and
    wherein the target network is a PLMN.

4. The method of claim 1, wherein the mobility information indicates that data delivery is not available via the RAN node of the source network.

5. The method of claim 1, wherein the mobility information indicates that data delivery is available via the N3IWF of the source network.

6. The method of claim 1, wherein the mobility information is forwarded to the N3IWF of the source network.

7. The method of claim 1, wherein the wireless device is in communication with at least one of a mobile device, a network, and/or autonomous vehicles other than the wireless device.

8. The method of claim 1, wherein the mobility information indicates that data delivery is available via the N3IWF of the source network.

9. A wireless device configured to operate in a wireless communication system, the wireless device comprising:
    at least one transceiver;
    at least one processor; and
    at least one computer memory operably connectable to the at least one processor and storing instructions that, based on being executed by the at least one processor, perform operations comprising:
    performing a first registration with a source network via a radio access network (RAN) node of the source network;
    performing a first protocol data unit (PDU) session establishment with the source network via the RAN node of the source network for establishing a multi-access PDU (MA PDU) session;
    performing a second registration with the source network via a non-3GPP interworking function (N3IWF) of the source network;
    performing a second PDU session establishment with the source network via the N3IWF of the source network for establishing the MA PDU session;
    wherein the second PDU session establishment comprises: transmitting a PDU session establishment request message which includes i) a MA PDU request indication for the MA PDU session, and ii) information informing that data delivery is not available via the N3IWF of the source network;
    receiving downlink (DL) data from the source network via the RAN node of the source network based on the MA PDU session;
    determining to move from the source network to a target network;
    transmitting, to a user plane function (UPF) of the source network, mobility information informing that the wireless device moves from the source network to the target network; and
    receiving DL data from the target network via the N3IWF of the source network.

10. The wireless device of claim 9, wherein the source network is a public land mobile network (PLMN), and
    wherein the target network is a stand-alone non-public network (SNPN).

11. The wireless device of claim 9, wherein the source network is an SNPN, and
wherein the target network is a PLMN.

12. The wireless device of claim 9, wherein the mobility information indicates that data delivery is not available via the RAN node of the source network.

13. The wireless device of claim 9, wherein the mobility information is forwarded to the N3IWF of the source network.

14. A processing apparatus configured to control a wireless device in a wireless communication system, the processing apparatus comprising:
   at least one processor; and
   at least one computer memory operably connectable to the at least one processor,
   wherein the at least one processor is configured to perform operations comprising:
   performing a first registration with a source network via a radio access network (RAN) node of the source network;
   performing a first protocol data unit (PDU) session establishment with the source network via the RAN node of the source network for establishing a multi-access PDU (MA PDU) session;
   performing a second registration with the source network via a non-3GPP interworking function (N3IWF) of the source network;
   performing a second PDU session establishment with the source network via the N3IWF of the source network for establishing the MA PDU session;
   wherein the second PDU session establishment comprises: generating a PDU session establishment request message which includes i) a MA PDU request indication for the MA PDU session, and ii) information informing that data delivery is not available via the N3IWF of the source network;
   obtaining downlink (DL) data from the source network via the RAN node of the source network based on the MA PDU session;
   determining to move from the source network to a target network;
   generating mobility information informing that the wireless device moves from the source network to the target network; and
   obtaining DL data from the target network via the N3IWF of the source network.

* * * * *